United States Patent
Danino

(10) Patent No.: US 12,487,871 B2
(45) Date of Patent: Dec. 2, 2025

(54) SYSTEMS AND METHODS FOR DETAILED CLOUD POSTURE REMEDIATION RECOMMENDATIONS UTILIZING CUSTOM LARGE LANGUAGE MODELS (LLMS)

(71) Applicant: Zscaler, Inc., San Jose, CA (US)

(72) Inventor: Shoham Danino, Tel-Aviv (IL)

(73) Assignee: Zscaler, Inc., San Jose, CA (US)

( * ) Notice: Subject to any disclaimer, the term of this patent is extended or adjusted under 35 U.S.C. 154(b) by 104 days.

(21) Appl. No.: 18/395,842

(22) Filed: Dec. 26, 2023

(65) Prior Publication Data

US 2025/0208936 A1  Jun. 26, 2025

(51) Int. Cl.
G06F 11/00  (2006.01)

(52) U.S. Cl.
CPC .................. G06F 11/008 (2013.01)

(58) Field of Classification Search
CPC ..................................... G06F 11/008
See application file for complete search history.

(56) References Cited

U.S. PATENT DOCUMENTS

| | | | |
|---|---|---|---|
| 11,483,322 B1 * | 10/2022 | Walther ................ | G06F 21/552 |
| 11,632,346 B1 | 4/2023 | Mahapatra et al. | |
| 11,785,033 B2 * | 10/2023 | Kfir ..................... | H04L 63/1425 |
| 12,321,252 B2 * | 6/2025 | Mo ...................... | G06F 11/3075 |
| 2010/0250726 A1 | 9/2010 | Moses et al. | |
| 2017/0230418 A1 * | 8/2017 | Amar ................... | H04L 63/10 |
| 2020/0264965 A1 * | 8/2020 | Harutyunyan ........ | H04L 41/142 |
| 2020/0273040 A1 * | 8/2020 | Novick ............... | G06Q 20/4016 |
| 2022/0171857 A1 * | 6/2022 | McHugh ............... | G06F 21/52 |
| 2023/0120174 A1 * | 4/2023 | Seck .................... | G06F 21/566 726/25 |
| 2023/0252127 A1 * | 8/2023 | Taylor ................... | G06F 21/46 726/6 |
| 2023/0385889 A1 * | 11/2023 | Ali ..................... | G06Q 30/0609 |
| 2024/0126632 A1 * | 4/2024 | Habel ................ | G06F 11/0772 |
| 2024/0330706 A1 * | 10/2024 | Pompili ................ | G06N 3/045 |
| 2025/0016181 A1 * | 1/2025 | Herszfang ........... | H04L 63/1416 |
| 2025/0086305 A1 * | 3/2025 | Rodniansky ........ | G06F 21/6227 |
| 2025/0119435 A1 * | 4/2025 | Boyer ................. | H04L 63/1433 |
| 2025/0126494 A1 * | 4/2025 | Lin ...................... | H04L 41/142 |
| 2025/0131468 A1 * | 4/2025 | Chen ................... | G08B 21/182 |
| 2025/0131492 A1 * | 4/2025 | Manges ............. | G06Q 30/0201 |
| 2025/0133100 A1 * | 4/2025 | Ayrapetov .......... | H04L 63/1425 |
| 2025/0150279 A1 * | 5/2025 | Freer .................... | H04L 9/3239 |
| 2025/0158894 A1 * | 5/2025 | Wu ..................... | H04L 41/064 |
| 2025/0184247 A1 * | 6/2025 | Tulczyjew ............ | H04L 41/16 |
| 2025/0211551 A1 * | 6/2025 | Danino ................. | H04L 51/02 |

* cited by examiner

*Primary Examiner* — Oleg Survillo
(74) *Attorney, Agent, or Firm* — Baratta Law PLLC; Lawrence A. Baratta, Jr.; Ryan Odessa

(57) ABSTRACT

Systems and methods for detailed cloud posture remediation recommendations utilizing custom Large Language Models (LLMs). The present systems and methods are configured to perform the steps of scanning a cloud environment for posture control data; generating one or more alerts related to any of risky configurations and risky activities associated with the cloud environment; generating one or more remediation recommendations based on the one or more alerts; and providing the one or more alerts and the one or more remediation recommendations to administrators of the cloud environment.

18 Claims, 33 Drawing Sheets

SYSTEMS AND METHODS FOR DETAILED CLOUD POSTURE REMEDIATION RECOMMENDATIONS UTILIZING CUSTOM LARGE LANGUAGE MODELS (LLMS)

FIELD OF THE DISCLOSURE

The present disclosure relates generally to networking and computing. More particularly, the present disclosure relates to systems and methods for detailed cloud posture remediation recommendations utilizing custom Large Language Models (LLMs).

BACKGROUND OF THE DISCLOSURE

Today's development teams work across many Infrastructure-as-a-Service (IaaS), Platform-as-a-Service (PaaS), and Software-as-a-Service (SaaS) offerings. Additionally, developers have shifted from developing monolithic web applications to leveraging microservices and serverless architectures. Securing cloud-native resources requires continuous automated risk assessment and security which needs to be tightly integrated into infrastructure as well as the applications themselves. With this said, traditional security approaches and siloed on-premises security solutions are not reliable enough to keep mission-critical applications and infrastructure secure. Further, such security solutions generate an excessive number of alerts for customers. To solve these problems, the present disclosure includes systems and methods to provide detailed recommendations for the most effective remediation strategies utilizing custom LLMs.

BRIEF SUMMARY OF THE DISCLOSURE

In an embodiment, the present disclosure includes a method with steps, a cloud-based system configured to implement the steps, and a non-transitory computer-readable medium storing computer-executable instructions for causing performance of the steps. The steps include scanning a cloud environment for posture control data; generating one or more alerts related to any of risky configurations and risky activities associated with the cloud environment; generating one or more remediation recommendations based on the one or more alerts; and providing the one or more alerts and the one or more remediation recommendations to administrators of the cloud environment.

The steps can further include wherein the one or more remediation recommendations each includes a step-by-step list of actions required to resolve the risky configurations and risky activities. The generating one or more remediation recommendations can be performed by a trained Large Language Model (LLM). The steps can further include collecting data, wherein the data includes cloud provider documentation and cloud security system documentation; and training the LLM with the collected data. A different LLM can be trained for each tenant of a cloud-based system. The steps can further include periodically collecting updated data; and retraining the LLM with the updated data. The one or more remediation recommendations can be provided via a Command Line Interface (CLI) command. The one or more remediation recommendations can be generated based on one or more generic remediations generated by a Cloud-Native Application Protection Platform (CNAPP) system. The steps can further include performing actions associated with the one or more remediation recommendations automatically. The posture control data can include any of assets, identities, network flow logs, activities, and code repositories in the cloud environment, wherein the one or more alerts correspond to risks associated therewith.

BRIEF DESCRIPTION OF THE DRAWINGS

The present disclosure is illustrated and described herein with reference to the various drawings, in which like reference numbers are used to denote like system components/method steps, as appropriate, and in which:

FIG. 4 is a block diagram of a user device, which may be used with the cloud-based system or the like.

FIG. 10 is a screenshot of a GUI displaying an IaC scan.

FIG. 17 is a screenshot of a GUI displaying build-time alerting and providing guided remediation.

FIG. 18 is a screenshot of a GUI displaying run-time alerting and providing automated remediation.

DETAILED DESCRIPTION OF THE DISCLOSURE

The traditional view of an enterprise network (i.e., corporate, private, industrial, operational, etc.) included a well-defined perimeter defended by various appliances (e.g., firewalls, intrusion prevention, advanced threat detection, etc.). In this traditional view, mobile users utilize a Virtual Private Network (VPN), etc. and have their traffic backhauled into the well-defined perimeter. This worked when mobile users represented a small fraction of the users, i.e., most users were within the well-defined perimeter. However, this is no longer the case—the definition of the workplace is no longer confined to within the well-defined perimeter, and with applications moving to the cloud, the perimeter has extended to the Internet. This results in an increased risk for the enterprise data residing on unsecured and unmanaged devices as well as the security risks in access to the Internet. Cloud-based security solutions have emerged, such as Zscaler Internet Access (ZIA), Zscaler Private Access (ZPA), and Zscaler Posture Control (ZPC) available from Zscaler, Inc., the applicant and assignee of the present application.

Example Cloud-Based System Architecture

Figure 1A:
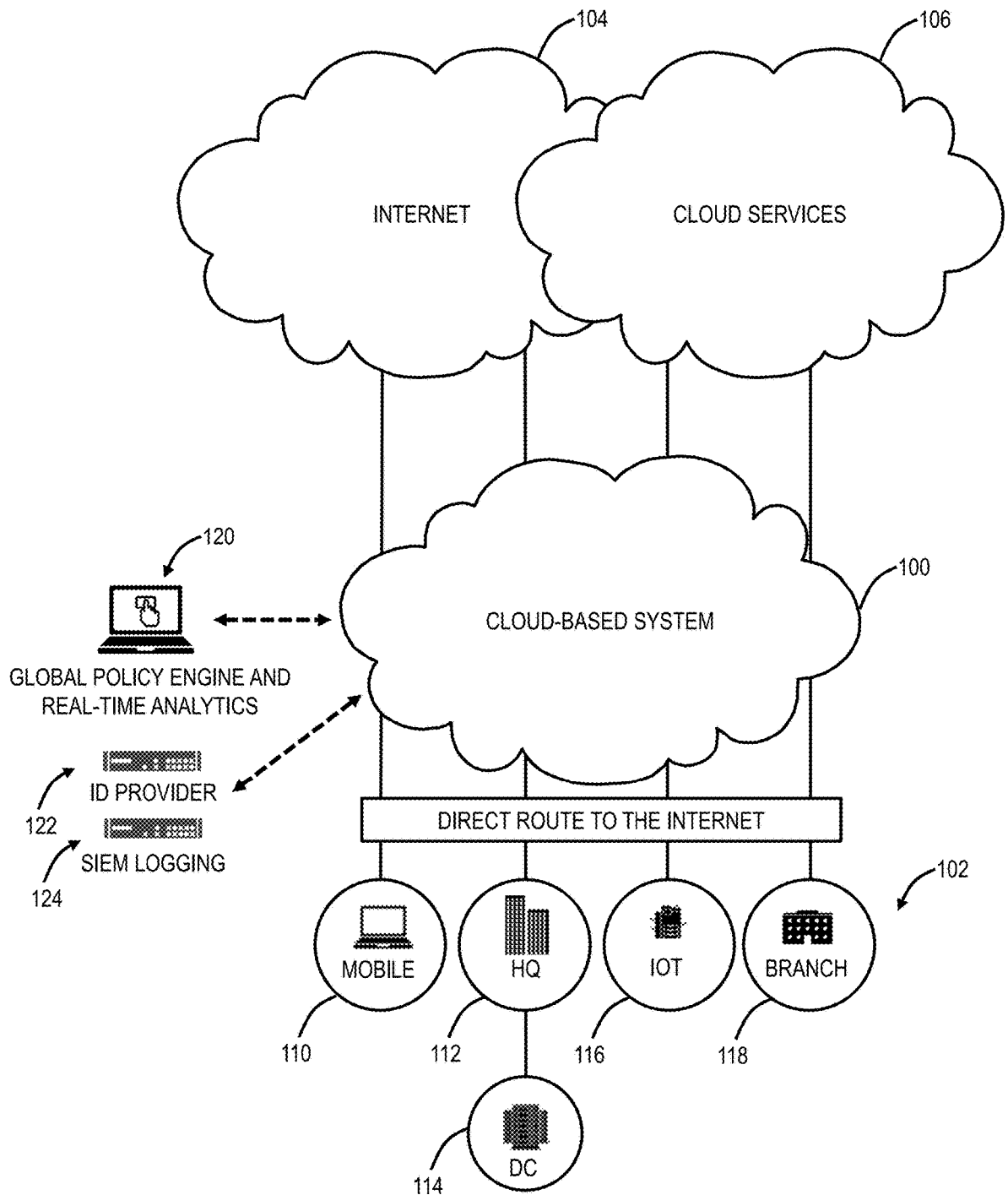
FIG. 1A is a network diagram of a cloud-based system offering security as a service.

FIG. 1A is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, anti-malware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 5:
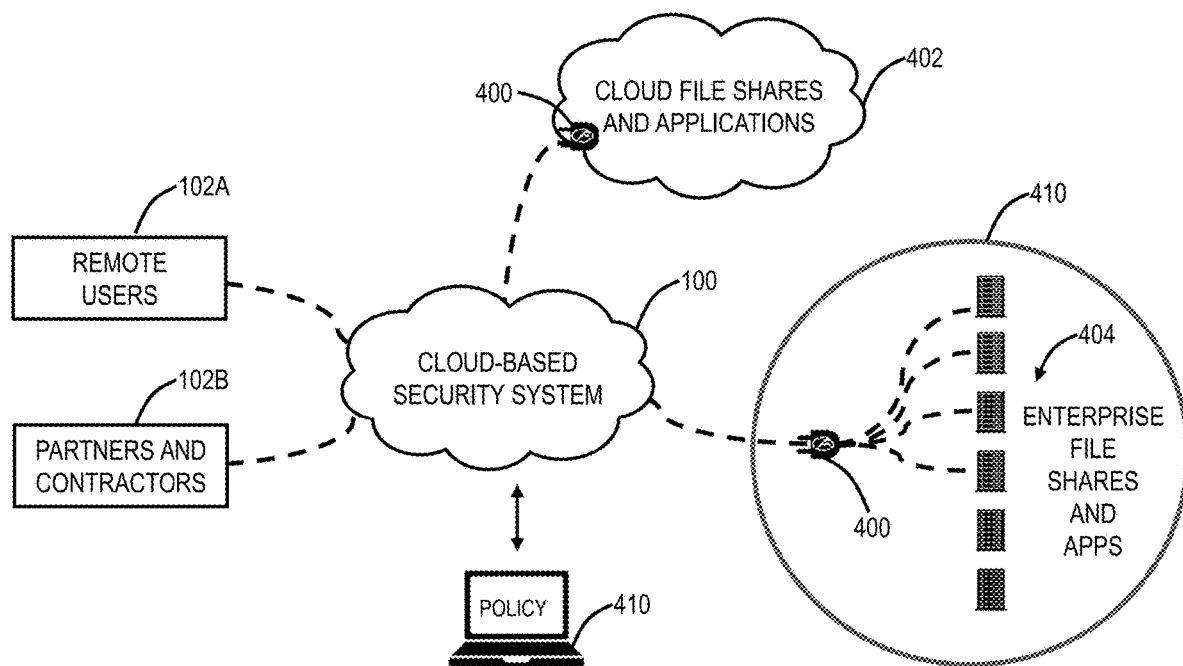
FIG. 5 is a network diagram of a Zero Trust Network Access (ZTNA) application utilizing the cloud-based system.

For illustration purposes, the users 102 of the cloud-based system 100 can include a mobile device 110, a headquarters (HQ) 112 which can include or connect to a data center (DC) 114, Internet of Things (IOT) devices 116, a branch office/remote location 118, etc., and each includes one or more user devices (an example user device 300 is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes-they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Zero Trust

Figure 1B:
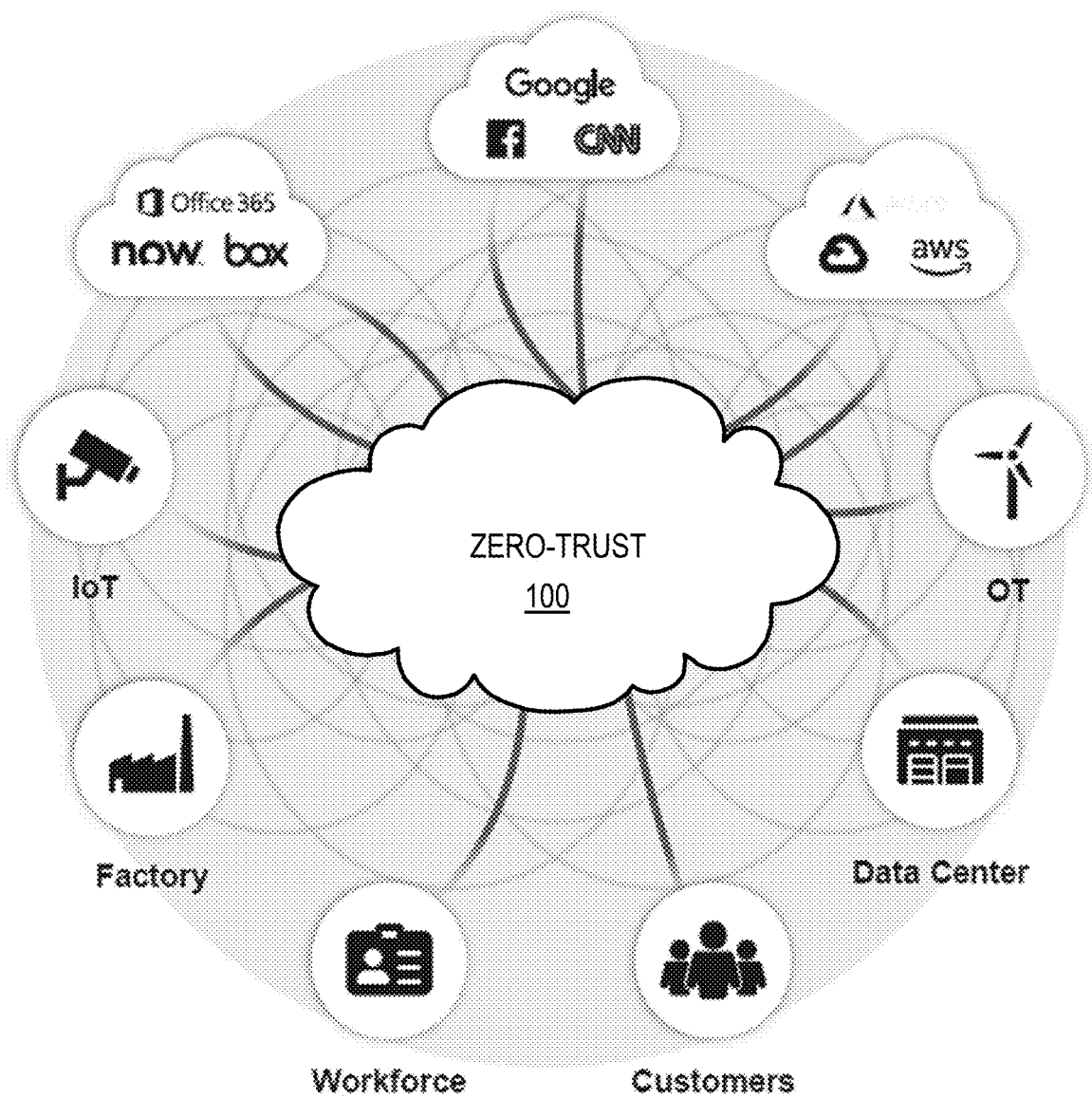
FIG. 1B is a logical diagram of the cloud-based system operating as a zero-trust platform.

FIG. 1B is a logical diagram of the cloud-based system 100 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud-based system 100. Zero trust is a cybersecurity strategy wherein security policy is applied based on context established through least-privileged access controls and strict user authentication—not assumed trust. A well-tuned zero trust architecture leads to simpler network infrastructure, a better user experience, and improved cyberthreat defense.

Establishing a zero trust architecture requires visibility and control over the environment's users and traffic, including that which is encrypted; monitoring and verification of traffic between parts of the environment; and strong multi-factor authentication (MFA) methods beyond passwords, such as biometrics or one-time codes. This is performed via the cloud-based system 100. Critically, in a zero trust architecture, a resource's network location is not the biggest factor in its security posture anymore. Instead of rigid network segmentation, your data, workflows, services, and such are protected by software-defined microsegmentation, enabling you to keep them secure anywhere, whether in your data center or in distributed hybrid and multicloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time—before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

Figure 1C:
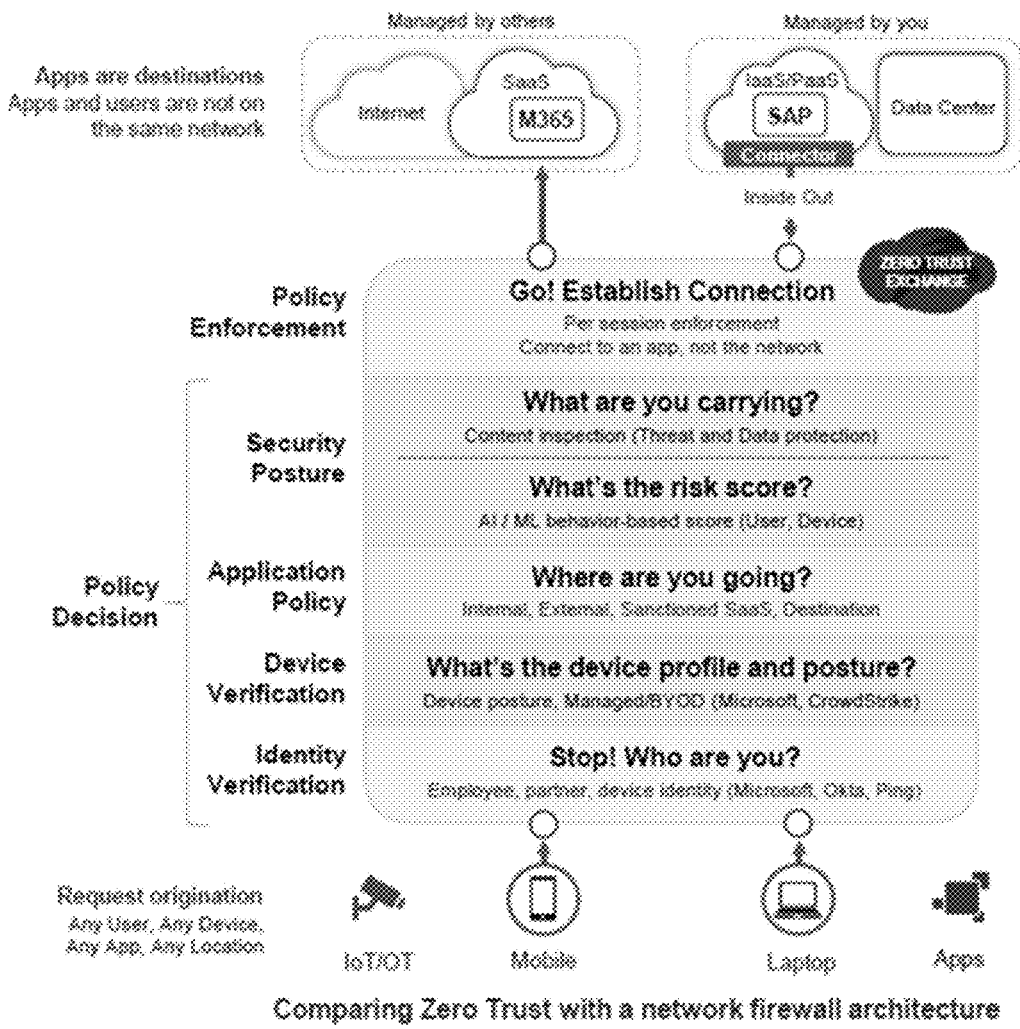
FIG. 1C is a logical diagram illustrating zero trust policies with the cloud-based system and a comparison with the conventional firewall-based approach.

FIG. 1C is a logical diagram illustrating zero trust policies with the cloud-based system 100 and a comparison with the conventional firewall-based approach. Zero trust with the cloud-based system 100 allows per session policy decisions and enforcement regardless of the user 102 location. Unlike the conventional firewall-based approach, this eliminates attack surfaces, there are no inbound connections; prevents lateral movement, the user is not on the network; prevents compromise, allowing encrypted inspection; and prevents data loss with inline inspection.

Example Implementation of the Cloud-Based System

Figure 2:
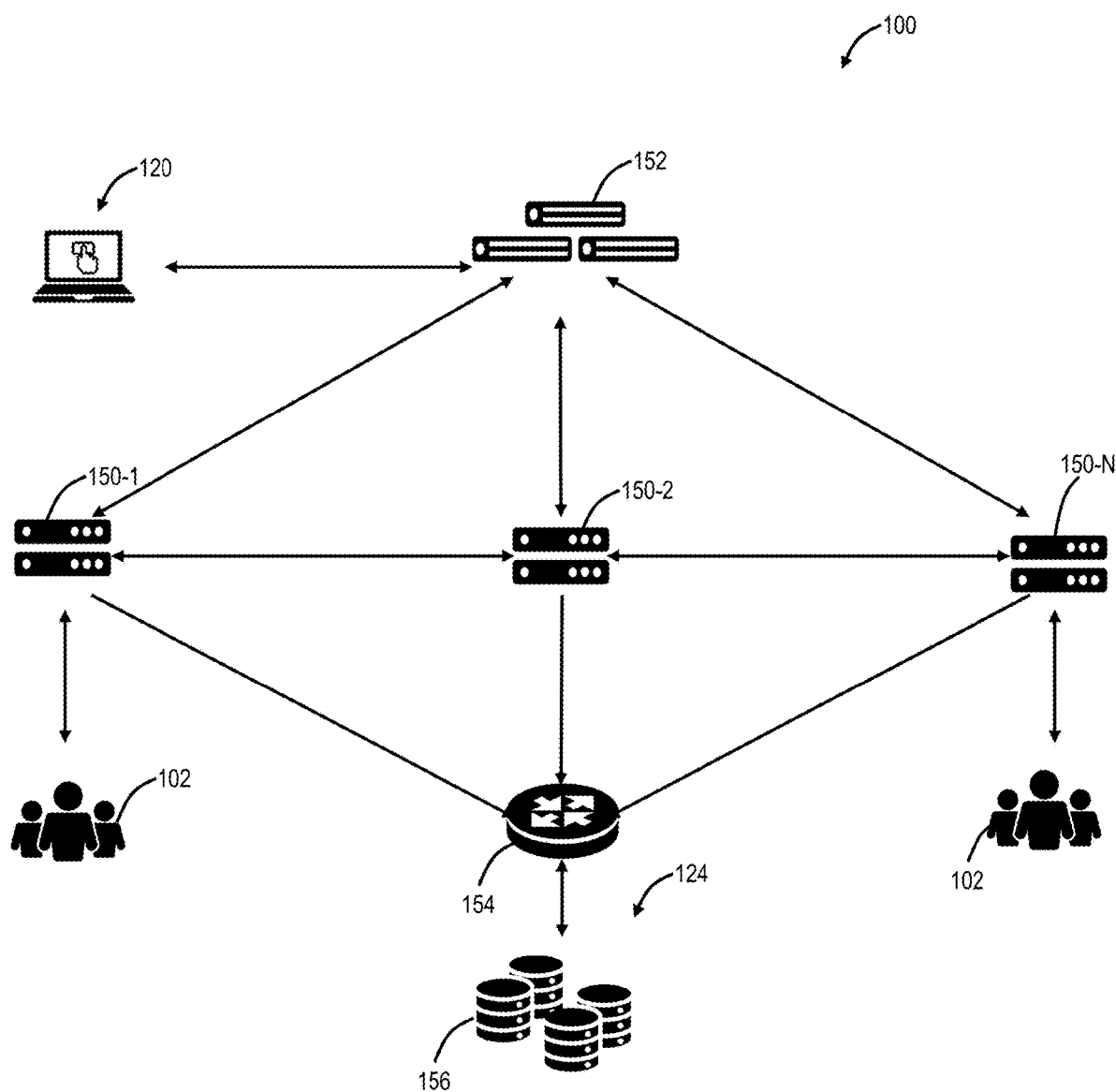
FIG. 2 is a network diagram of an example implementation of the cloud-based system.
Figure 4:
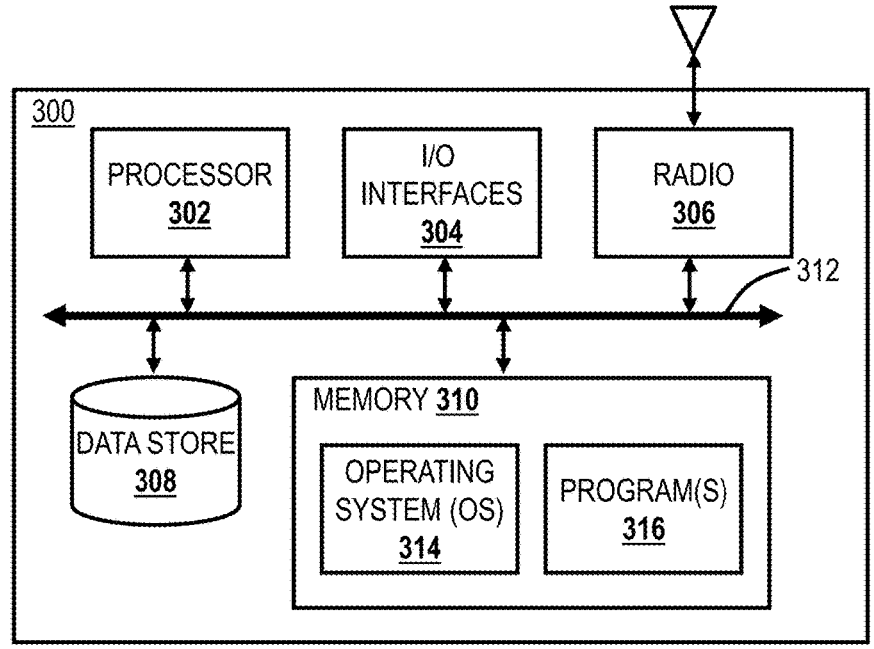

FIG. 2 is a network diagram of an example implementation of the cloud-based system 100. In an embodiment, the cloud-based system 100 includes a plurality of nodes 150, labeled as nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the nodes 150. The central authority 152 provide centralized policy, real-time threat updates, etc. and coordinates the distribution of this data between the nodes 150. The nodes 150 provide an onramp to the users 102 and are configured to execute policy, based on the central authority 152, for each user 102. The nodes 150 can be geographically distributed, and the policy for each user 102 follows that user 102 as he or she connects to the nearest (or other criteria) node 150.

Of note, the cloud-based system 100 is an external system meaning it is separate from tenant's private networks (enterprise networks) as well as from networks associated with the devices 110, 116, and locations 112, 118. Also, of note, the present disclosure describes a private node 150P that is both part of the cloud-based system 100 and part of a private network. Further, the term nodes as used herein with respect to the cloud-based system 100 can be one or more servers, including physical servers, virtual machines (VM) executed on physical hardware, appliances, custom hardware, compute resources, clusters, etc., as described above, i.e., the nodes 150 contemplate any physical implementation of computer resources. In some embodiments, the nodes 150 can be Secure Web Gateways (SWGs), proxies, Secure Access Service Edge (SASE), etc.

The nodes 150 are full-featured secure internet gateways that provide integrated internet security. They inspect all web traffic bi-directionally for malware and enforce security, compliance, and firewall policies, as described herein, as well as various additional functionality. In an embodiment, each node 150 has two main modules for inspecting traffic and applying policies: a web module and a firewall module. The nodes 150 are deployed around the world and can handle hundreds of thousands of concurrent users with millions of concurrent sessions. Because of this, regardless of where the users 102 are, they can access the Internet 104 from any device, and the nodes 150 protect the traffic and apply corporate policies. The nodes 150 can implement various inspection engines therein, and optionally, send sandboxing to another system. The nodes 150 include significant fault tolerance capabilities, such as deployment in active-active mode to ensure availability and redundancy as well as continuous monitoring.

In an embodiment, customer traffic is not passed to any other component within the cloud-based system 100, and the nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the nodes 150. In another embodiment, specific data specified by each tenant, e.g., only email, only executable files, etc., is processed through one of the nodes 150.

Each of the nodes 150 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the node 150 may allow the distribution of the content item, preclude distribution of the content item, allow distribution of the content item after a cleaning process, or perform threat detection on the content item. In an embodiment, the actions taken by one of the nodes 150 may be determinative on the threat classification of the content item and on a security policy of the tenant to which the content item is being sent from or from which the content item is being requested by. A content item is violating if, for any part $C=[c1, c2, \ldots, cm]$ of the content item, at any of the nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The nodes 150 establish persistent connections to the central authority 152 to download all policy configurations. When a new user connects to a node 150, a policy request is sent to the central authority 152 through this connection. The central authority 152 then calculates the policies that apply to that user 102 and sends the policy to the node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the nodes 150 request the new policy when the user 102 next makes a request. In an embodiment, the node 150 exchange "heartbeats" periodically, so all nodes 150 are informed when there is a policy change. Any node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QOS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Example Server Architecture

Figure 3:
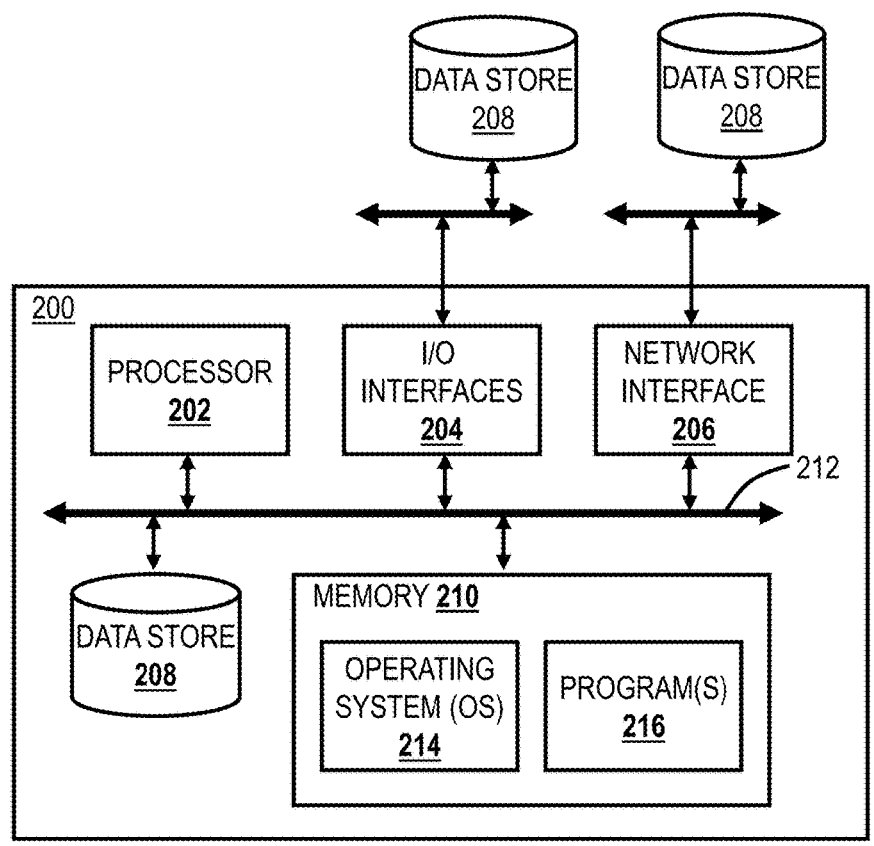
FIG. 3 is a block diagram of a server, which may be used in the cloud-based system, in other systems, or standalone.

FIG. 3 is a block diagram of a server 200, which may be used in the cloud-based system 100, in other systems, or standalone. For example, the nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IOT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

Zero Trust Network Access Using the Cloud-Based System

FIG. 5 is a network diagram of a Zero Trust Network Access (ZTNA) application utilizing the cloud-based system 100. For ZTNA, the cloud-based system 100 can dynamically create a connection through a secure tunnel between an endpoint (e.g., users 102A, 102B) that are remote and an on-premises connector 400 that is either located in cloud file shares and applications 402 and/or in an enterprise network 410 that includes enterprise file shares and applications 404. The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise (on-premises) "dials out" and connects to the cloud-based system 100 as if too were an endpoint. This on-demand dial-out capability and tunneling authenticated traffic back to the enterprise is a key differentiator for ZTNA. Also, this functionality can be implemented in part by an application 350 on the user device 300. Also, the applications 402, 404 can include B2B applications. Note, the difference between the applications 402, 404 is the applications 402 are hosted in the cloud, whereas the applications 404 are hosted on the enterprise network 410. The services described herein contemplates use with either or both of the applications 402, 404.

The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402, 404 from the network, instead of providing access with a connector 400, in front of the applications 402, 404, an application on the user device 300, a central authority 152 to push policy, and the cloud-based system 100 to stitch the applications 402, 404 and the software connectors 400 together, on a per-user, per-application basis.

With the virtual private access, users can only see the specific applications 402, 404 allowed by the central authority 152. Everything else is "invisible" or "dark" to them. Because the virtual private access separates the application from the network, the physical location of the application 402, 404 becomes irrelevant-if applications 402, 404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy because the virtual private access is a service offering to end-users and enterprises.

§ 6.0 Digital Experience Monitoring

Figure 6:
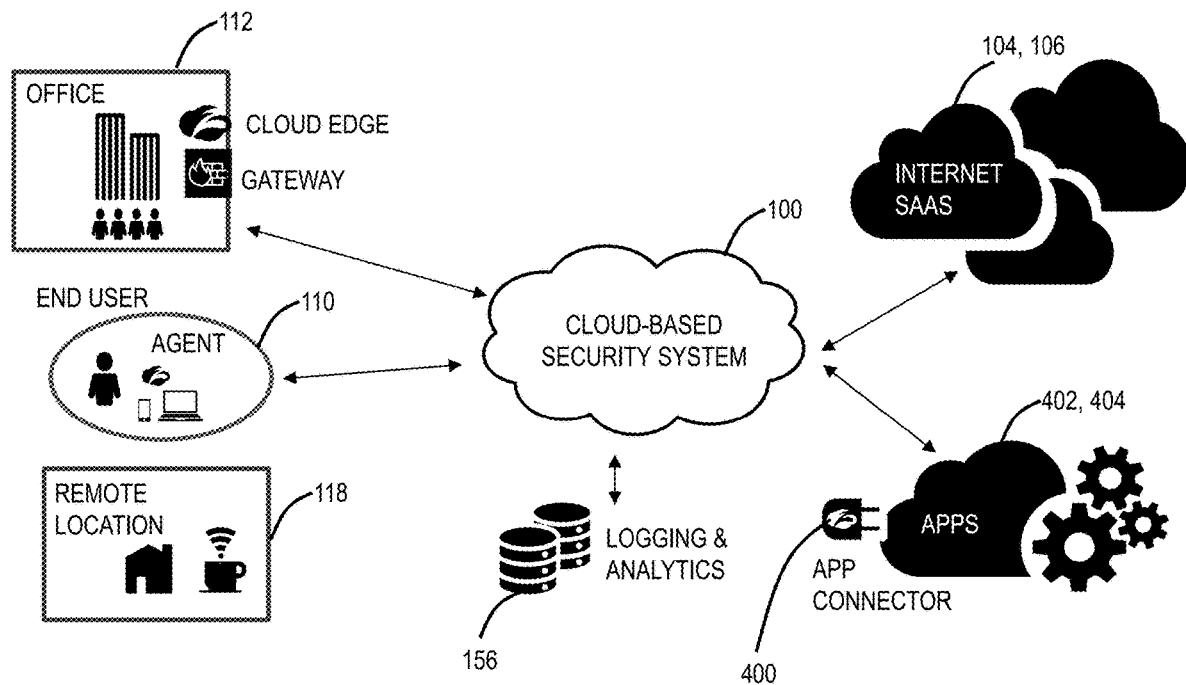
FIG. 6 is a network diagram of the cloud-based system in an application of digital experience monitoring.

FIG. 6 is a network diagram of the cloud-based system 100 in an application of digital experience monitoring. Here, the cloud-based system 100 providing security as a service as well as ZTNA, can also be used to provide real-time, continuous digital experience monitoring, as opposed to conventional approaches (synthetic probes). A key aspect of the architecture of the cloud-based system 100 is the inline monitoring. This means data is accessible in real-time for individual users from end-to-end. As described herein, digital experience monitoring can include monitoring, analyzing, and improving the digital user experience.

The cloud-based system 100 connects users 102 at the locations 110, 112, 118 to the applications 402, 404, the Internet 104, the cloud services 106, etc. The inline, end-to-end visibility of all users enables digital experience monitoring. The cloud-based system 100 can monitor, diagnose, generate alerts, and perform remedial actions with respect to network endpoints, network components, network links, etc. The network endpoints can include servers, virtual machines, containers, storage systems, or anything with an IP address, including the Internet of Things (IoT), cloud, and wireless endpoints. With these components, these network endpoints can be monitored directly in combination with a network perspective. Thus, the cloud-based system 100 provides a unique architecture that can enable digital experience monitoring, network application monitoring, infrastructure component interactions, etc. Of note, these various monitoring aspects require no additional components—the cloud-based system 100 leverages the existing infrastructure to provide this service.

Again, digital experience monitoring includes the capture of data about how end-to-end application availability, latency, and quality appear to the end user from a network perspective. This is limited to the network traffic visibility and not within components, such as what application performance monitoring can accomplish. Networked application monitoring provides the speed and overall quality of networked application delivery to the user in support of key business activities. Infrastructure component interactions include a focus on infrastructure components as they interact via the network, as well as the network delivery of services or applications. This includes the ability to provide network path analytics.

The cloud-based system 100 can enable real-time performance and behaviors for troubleshooting in the current state of the environment, historical performance and behaviors to understand what occurred or what is trending over time, predictive behaviors by leveraging analytics technologies to distill and create actionable items from the large dataset collected across the various data sources, and the like. The cloud-based system 100 includes the ability to directly ingest any of the following data sources network device-generated health data, network device-generated traffic data, including flow-based data sources inclusive of NetFlow and IPFIX, raw network packet analysis to identify application types and performance characteristics, HTTP request metrics, etc. The cloud-based system 100 can operate at 10 gigabits (10 G) Ethernet and higher at full line rate and support a rate of 100,000 or more flows per second or higher.

The applications 402, 404 can include enterprise applications, Office 365, Salesforce, Skype, Google apps, internal applications, etc. These are critical business applications where user experience is important. The objective here is to collect various data points so that user experience can be quantified for a particular user, at a particular time, for purposes of analyzing the experience as well as improving the experience. In an embodiment, the monitored data can be from different categories, including application-related, network-related, device-related (also can be referred to as endpoint-related), protocol-related, etc. Data can be collected at the application 350 or the cloud edge to quantify user experience for specific applications, i.e., the application-related and device-related data. The cloud-based system 100 can further collect the network-related and the protocol-related data (e.g., Domain Name System (DNS) response time).

Application-Related Data

| | |
|---|---|
| Page Load Time | Redirect count (#) |
| Page Response Time | Throughput (bps) |
| Document Object Model (DOM) Load Time | Total size (bytes) |
| Total Downloaded bytes | Page error count (#) |
| App availability (%) | Page element count by category (#) |

Network-Related Data

| | |
|---|---|
| HTTP Request metrics | Bandwidth |
| Server response time | Jitter |
| Ping packet loss (%) | Trace Route |
| Ping round trip | DNS lookup trace |
| Packet loss (%) | GRE/IPSec tunnel monitoring |
| Latency | MTU and bandwidth measurements |

Device-Related Data (Endpoint-Related Data)

| | |
|---|---|
| System details | Network (config) |
| Central Processing Unit (CPU) | Disk |
| Memory (RAM) | Processes |
| Network (interfaces) | Applications |

Metrics could be combined. For example, device health can be based on a combination of CPU, memory, etc. Network health could be a combination of Wi-Fi/LAN connection health, latency, etc. Application health could be a combination of response time, page loads, etc. The cloud-based system 100 can generate service health as a combination of CPU, memory, and the load time of the service while processing a user's request. The network health could be based on the number of network path(s), latency, packet loss, etc.

The lightweight connector 400 can also generate similar metrics for the applications 402, 404. In an embodiment, the metrics can be collected while a user is accessing specific applications that user experience is desired for monitoring. In another embodiment, the metrics can be enriched by triggering synthetic measurements in the context of an inline transaction by the application 350 or cloud edge. The metrics can be tagged with metadata (user, time, app, etc.) and sent to a logging and analytics service for aggregation, analysis, and reporting. Further, network administrators can get UEX reports from the cloud-based system 100. Due to the inline nature and the fact the cloud-based system 100 is an overlay (in-between users and services/applications), the cloud-based system 100 enables the ability to capture user experience metric data continuously and to log such data historically. As such, a network administrator can have a long-term detailed view of the network and associated user experience.

Posture Control

The present disclosure provides systems and methods for posture control, also referred to as a Cloud-Native Application Protection Platform (CNAPP). Various embodiments provide cloud-native application security as an agentless solution that utilizes machine learning to correlate hidden risks caused by misconfigurations, threats, and vulnerabilities across the cloud-based system. Thus, security and development teams can prioritize and remediate risk associated with cloud-native applications as early as possible. Present solutions provide a comprehensive cloud security solution for all applications running on any service in the cloud-based system.

Cloud transformation introduces risks and security challenges to customers' security postures. Developers and infrastructure teams utilizing agile application development and deployment often overlook traditional security checks. Associated risks are further amplified by the fact that there can be hundreds of cloud services across a plurality of clouds, and no cloud service provider has the same capabilities. This makes it extremely difficult to maintain consistent zero trust security controls across the various clouds and workloads running in the multiple clouds.

Another issue faced by cloud security is the fact that most customers suffer from limited, or a lack of, visibility into what is running in the cloud. This includes limited visibility into where critical data is stored, what identities can access the critical data, and if any vulnerabilities exist in their code, applications, or cloud configurations. Various solutions to such problems have included bombarding operations teams with alerts, making it difficult and time-consuming to fine and resolve important issues.

Present systems and methods discover all assets for misconfiguration, vulnerabilities, and noncompliance. The use of machine learning and advanced threat correlation allows prioritization of high-impact risks. Embodiments further optimize responses with rich context, actionable information, automated guardrails, and step-by-step guided remediation. In order to comply with internal and external policies, various methods utilize preconfigured security policies and compliance libraries. Additionally, present systems can integrate with various ecosystems to enhance cross-collaboration and communication of threat remediation. A unified posture control platform can consolidate security stacks by replacing multipoint solutions with the present systems and methods.

Comprehensive coverage eliminates overhead and risk associated with disconnected point solutions by utilizing the present unified CNAPP. The unified CNAPP converges Cloud Security Posture Management (CSPM), Cloud Infrastructure Entitlement Management (CIEM), Configuration Management Database (CMDB), and Cloud Workload Protection Platform (CWPP) alongside Infrastructure as Code (IaC) security, vulnerability management, and compliance management.

Figure 7:
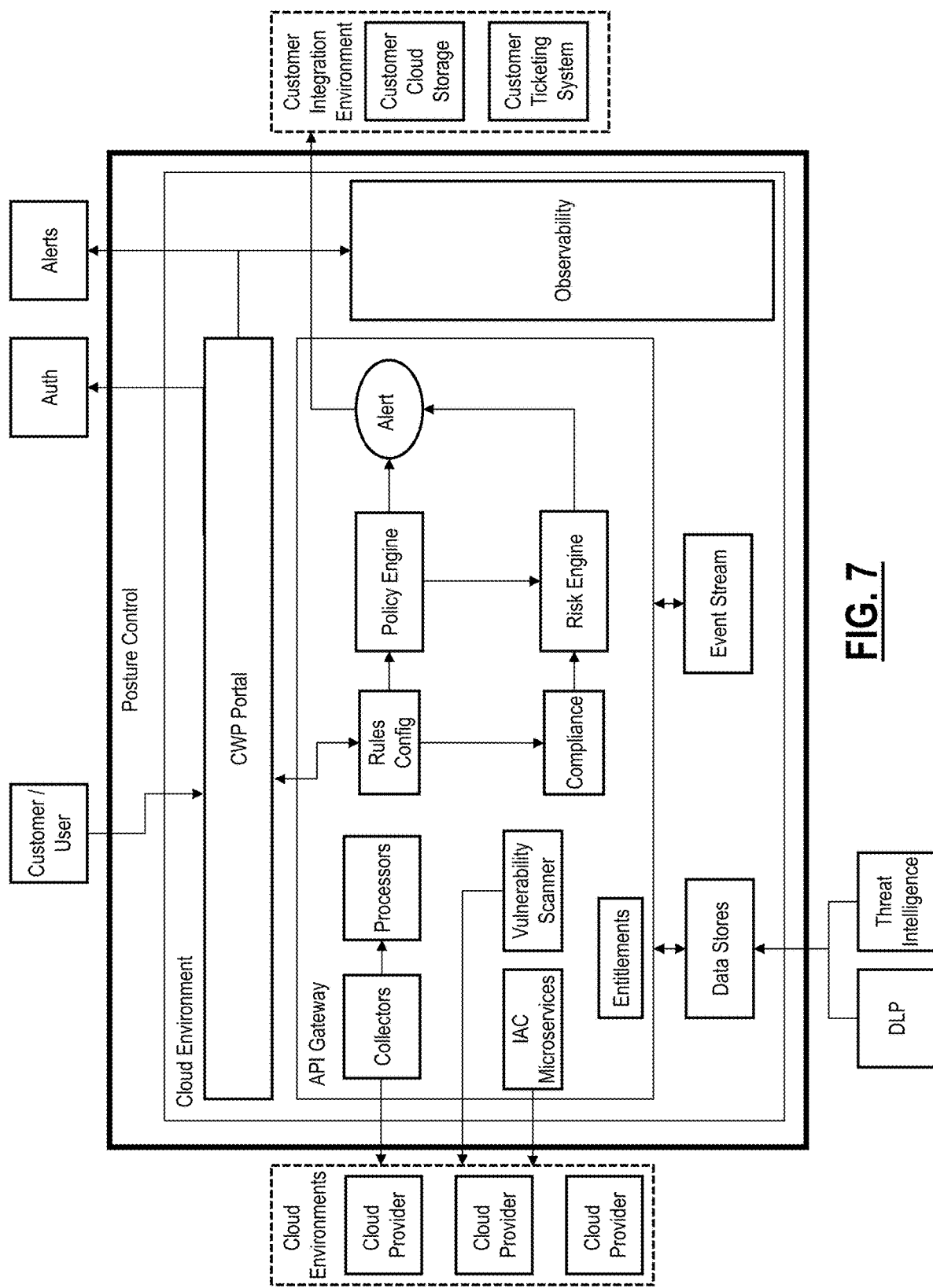
FIG. 7 is a diagram of a posture control architecture.

FIG. 7 is a diagram of a posture control architecture. Various embodiments of the posture control architecture are described herein with reference to various components depicted in FIG. 7. It will be appreciated that the examples disclosed herein are non-limiting examples, and other embodiments including other components known to one of skill in the art are also contemplated.

Various embodiments are adapted to uncover combinations of misconfigurations or activities that are seemingly low-risk in isolation, but together can create a real risk. Systems can additionally automatically prioritize correlated risks to improve Security Operations Center (SOC) efficiency and reduce alert fatigue. In order to identify and prioritize risk, embodiments of CNAPP are adapted to scan container images in registries and VMs in production environments.

Various embodiments include integration of CNAPP into development platforms (for example, VS Code), development operations tools (for example, GitHub and Jenkins), and security ecosystems (for example, ServiceNow, JIRA, and Splunk) to provide visibility, alerting, and control from early stages of builds to run stages. Similarly, embodiments of CNAPP are adapted to monitor automated deployment processes and send alerts when they identify critical security issues.

Embodiments of CNAPP can integrate with various cloud environments from a plurality of cloud providers (i.e., Amazon Web Services (AWS), Microsoft Azure, Google Cloud, etc.) and development operations tools to provide the various features of the present disclosure.

Figure 8:
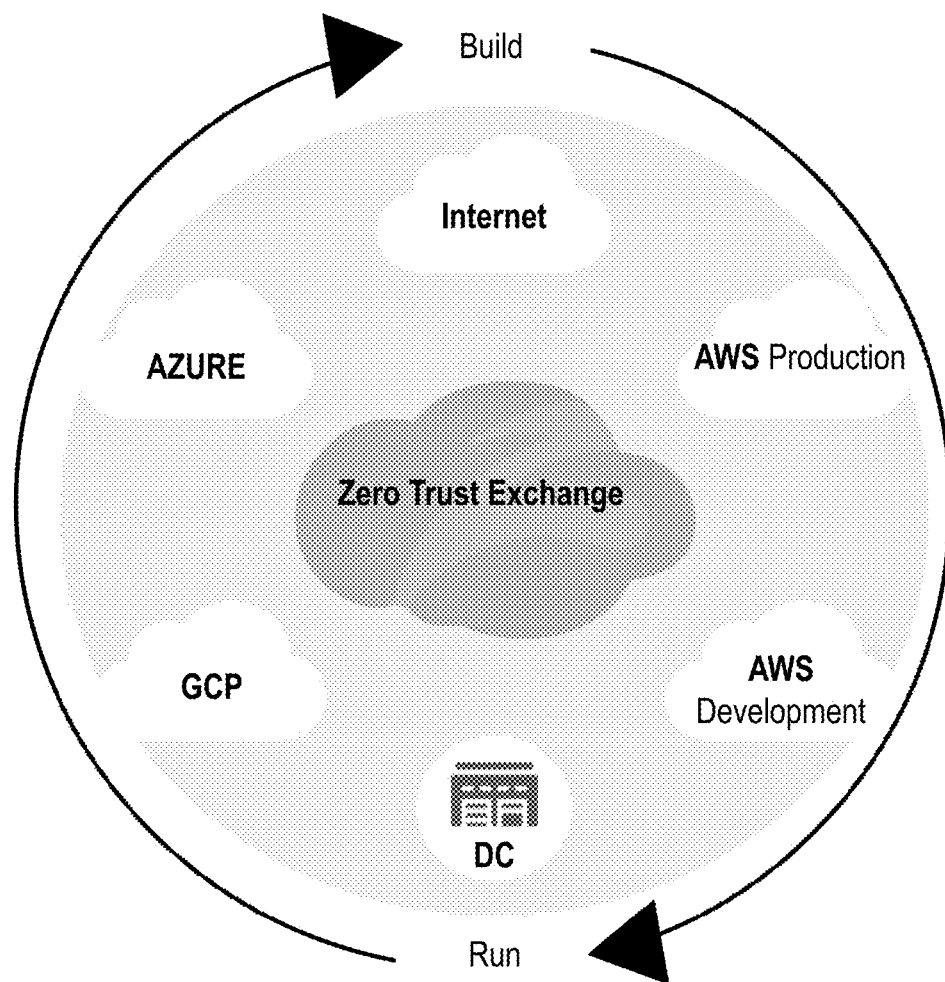
FIG. 8 is a network diagram of a zero trust architecture for providing an integrated security platform.

Again, the present disclosure provides systems and methods for posture control (CNAPP) to provide an integrated security platform from build to run. Various cloud security challenges include rapidly expanding workloads across a plurality of cloud platforms. Multiple point products and poor integrations can lead to data loss (i.e., CSPM, CIEM, IaC Scanning, DLP, etc.). Also, providing too many alerts and no context can make it difficult to identify true risk. FIG. 8 is a network diagram of a zero trust architecture for providing an integrated security platform. Posture control can provide exposure scanning to identify exposed assets and vulnerabilities (attack surfaces) and discover sensitive data. Configuration scanning allows posture control to identify and prioritize misconfigurations and identify excessive permissions for users and workloads. For example, identifying a user or workload having excessive permissions when the user or workload is deemed to be suspicious or risky. The present zero trust architecture securely connects users to applications, applications to applications, and machines to machines over any network in any location.

Discovery

Various embodiments of the posture control process include discovering raw information (posture control data) across multi-cloud and public cloud environments to produce correlative cloud security analytics. Such discovering can be a result of the scanning disclosed herein. For the discovery stage to operate, various embodiments allow onboarding and configuring of modules for automated discovery of all assets, identities, network flow logs, and activities in a particular public cloud environment. For IaC discovery, embodiments of posture control allow its customers to onboard code repositories and CI/CD tools hosted as SaaS services or self-hosted on on-premise environments. The discovery of data (i.e., assets, identities, network flow logs, activities, code repositories, CI/CD tools, configurations, etc.) can alternatively be referred to as scanning for or discovering posture control data. IaC code repositories and CI/CD environments are also referred to as build-time environments, whereas public cloud environments are referred to as run-time cloud environments. The various configurations of automated discovery can additionally be referred to as discovery modules.

Various embodiments allow configurable parameters for all discovery modules to collect changes at preconfigured intervals. Various configurable discovery module parameters include minimum time-frequency to collect ongoing changes, maximum time-frequency to collect ongoing changes, and stop collection of data in any discovery module at a preconfigured date and time. The various discovery modules enable a plurality of ways to collect (scan for) data from customers' environments and allow various modes of collection. In some embodiments, the modes of collection include APIs exposed to public cloud vendors and SaaS service providers for code repositories and CI/CD tools. Additionally, file transfers via HTTPS from public cloud storages and data lakes are also contemplated. In various embodiments, collection/scanning of data includes fully agentless scanning.

Figure 9:
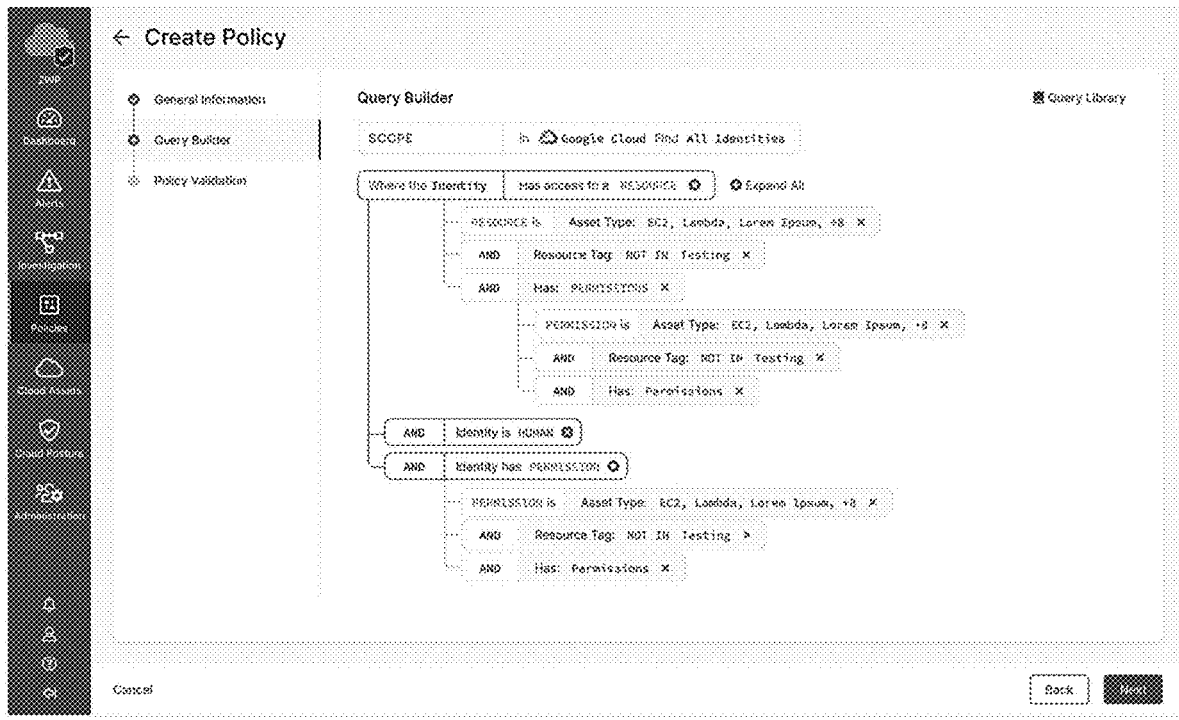
FIG. 9 is a screenshot of a Graphical User Interface (GUI) displaying an asset and identity timeline.

FIG. 9 is a screenshot of a Graphical User Interface (GUI) that can be utilized to configure policies. The various configurable parameters can be customized for specific identities, groups of identities, types of identities, identities with specific entitlements, etc. The various policies can further be a part of the discovery modules.

Findings

Figure 10:
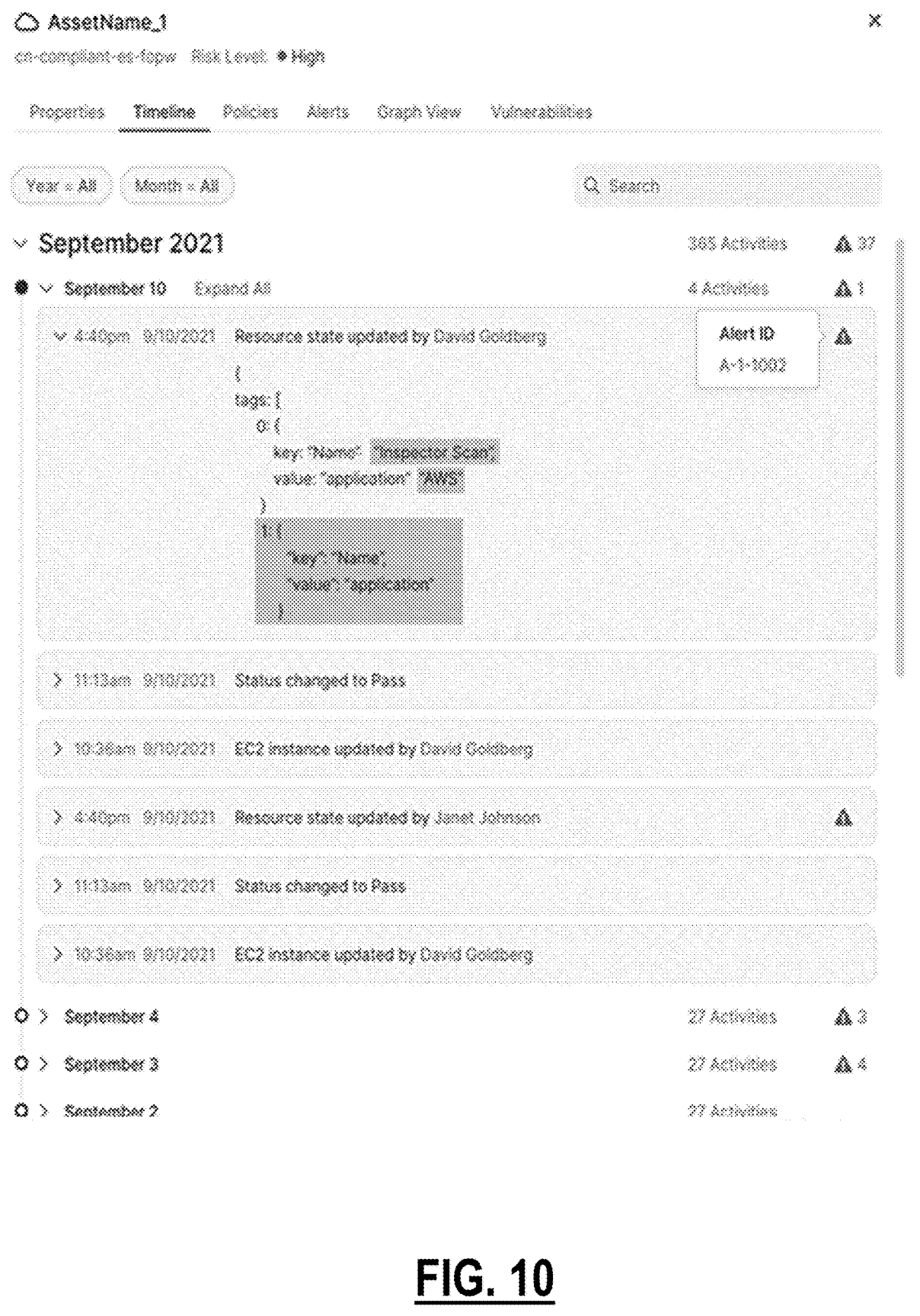

In various embodiments, multi-cloud Configuration Management Databases (CMDBs) provide current and historical configurations of all things uniquely identifiable in the public cloud (run-time cloud) environments. Historical configurations can be identified up to a preconfigured historical date (i.e., 180 days prior), while current configurations are updated in real-time. Further, various features include identifying activities performed by identities across all public cloud environments. This similarly provides a historical view of activities performed by human or non-human identities present in Identity and Access Management (IAM) catalogs of native public cloud environments. FIG. 10 is a screenshot of a GUI displaying an asset and identity timeline. The example of FIG. 10 shows a timeline of activities associated with an identity. Such visualizations can provide the ability to search assets based on tags, regions, etc. They also provide the ability to view and download metadata, understand who changed what and when, and perform investigations by correlating events with alerts. Such investigations help to understand associated assets with their relationship, understand who has access to what and how, and visualize such relationships, alerts, and vulnerabilities in graphical representation.

Additionally, cloud infrastructure entitlement management provides a relationship between human and non-human identities including their authorization permissions to perform various actions in public cloud environments. The various data ingested from discovery modules can be aggregated to analyze transport layer communication in public clouds. Security policy findings modules can detect invalid configurations in run-time or build-time environments based on user preferences and rules enabled from pre-configurations in posture control systems.

In run-time environments, posture management can identify misconfiguration issues to provide compliance risks in the cloud. It can also be enabled to provide continuous monitoring and real-time security postures of individual compliance benchmarks based on data collected at set time intervals from the various discovery modules.

Figure 11:
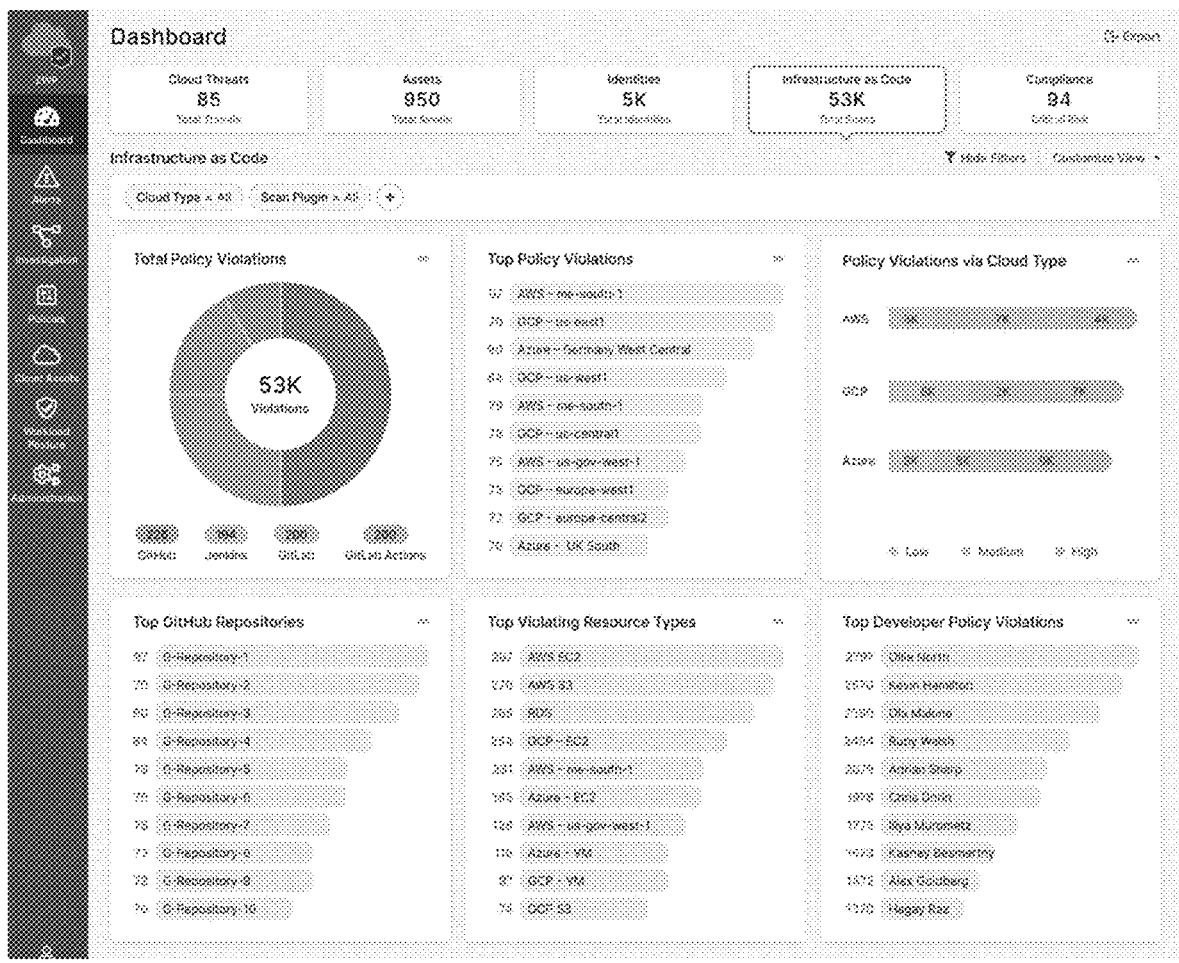
FIG. 11 is a screenshot of a GUI displaying a graphical visualization correlating relationships in a cloud environment.

Cloud security posture management identifies misconfiguration issues in build-time environments to provide compliance risks before asset/changes are deployed to the cloud environment via scripts in the code repositories. FIG. 11 is a screenshot of a GUI displaying an IaC scan. Further, posture control provides continuous monitoring and real-time security postures of individual compliance benchmarks based on the changes made in code repositories, CI/CD tools and data ingested at set intervals from the discovery modules.

Correlation

The various findings and discovery modules disclosed herein include correlated policies and alerts. Based on the invalid findings and risks determined by security policy findings, the correlated policies allow systems to generate alerts on the uniquely identifiable resources from the various multi cloud CMDBs. Alert rules can be configured to receive a subset of required alerts on one or more configured communication channels (i.e., internet based messaging platforms, Short Messaging Service (SMS), Email, etc.).

Figure 12:
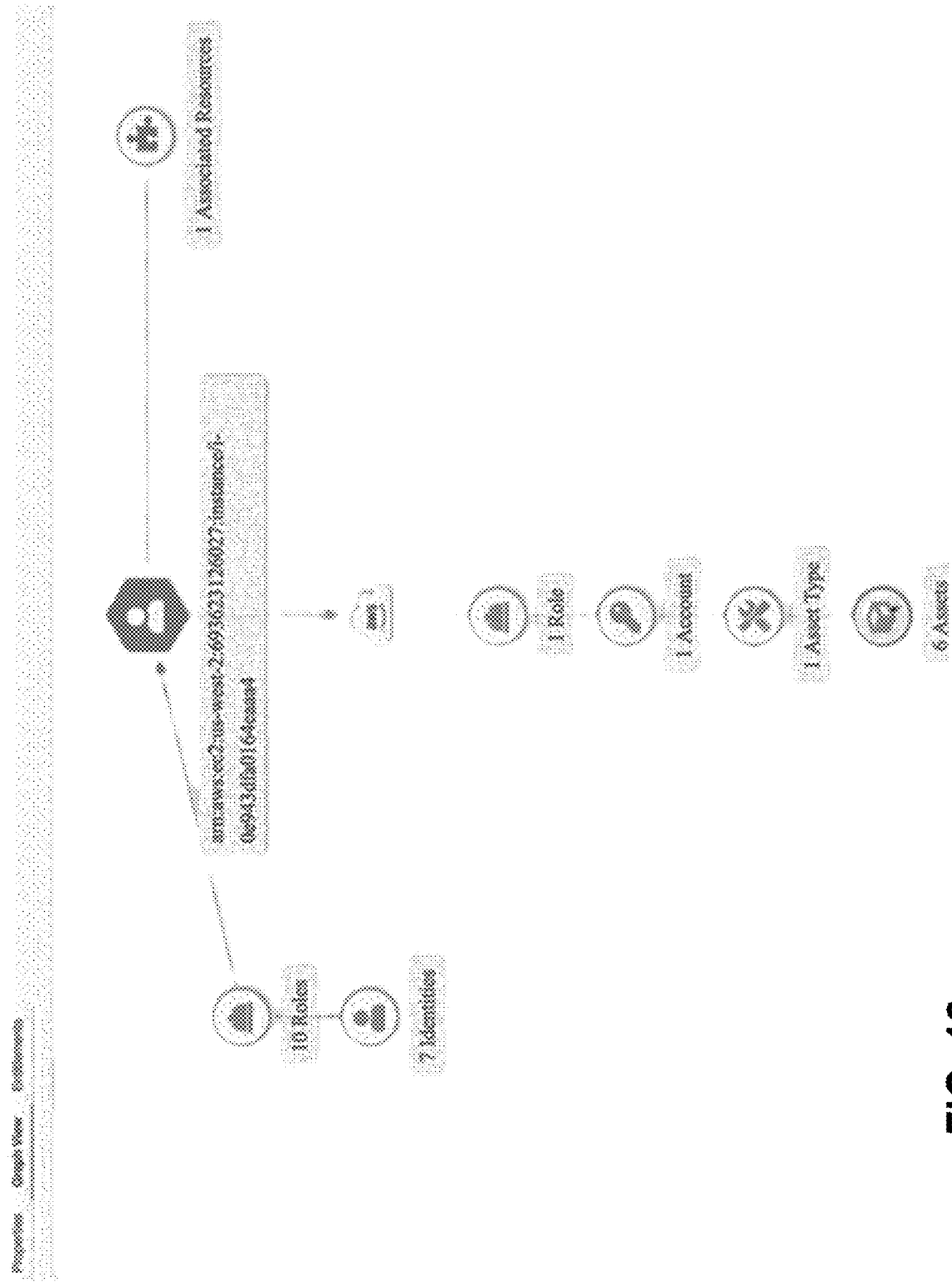
FIG. 12 is a screenshot of a GUI displaying a visualization of compliance tracking.

FIG. 12 is a screenshot of a GUI displaying a graphical visualization correlating relationships in a cloud environment. Various examples of correlated policies include an instance with powerful access permissions that is exposed to the public. Compromising such an instance can give an attacker a wide attack surface and access to resources. An attacker can gain access to the instance because it is exposed to the internet, and can thus access resources due to instance privileges. An instance such as this with high privileges has a higher impact if it is compromised. Another example includes creating credentials for a privileged service principal, which is seen as a risky activity. Various rules can detect when credentials are created for a privileged service principal, because the credentials can be used to access an account from the internet, thus bypassing authentication controls. Further, rules can detect when a bucket object level encryption key is set to an external key. If the external key is owned by an attacker, the attacker can later block access to the key and lockout the bucket owner from accessing the objects. It will be appreciated that the examples set forth in the present disclosure are non-limiting, and other rules and correlations are contemplated by various embodiments.

Analytics

Figure 13:
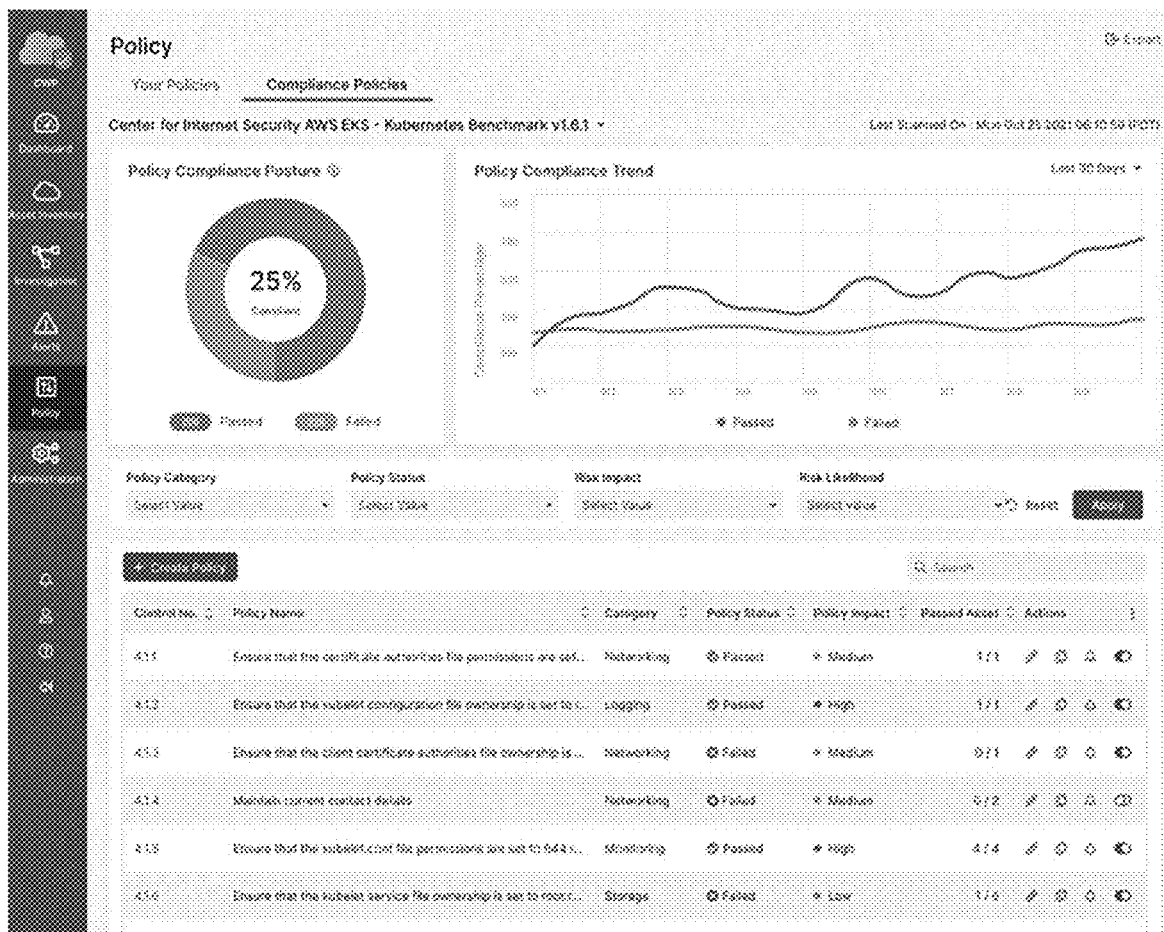
FIG. 13 is a screenshot of a GUI displaying a page for entitlement management and least-privilege enforcement.

Various embodiments of posture control can provide informative analytics which include high impact risk correlation and timelines across all discovery modules. As stated previously, embodiments of the present disclosure are adapted to monitor compliance via various compliance policies. In various embodiments, continuous compliance posture tracking takes place. FIG. 13 is a screenshot of a GUI displaying a visualization of compliance tracking. The GUI provides the ability to view the continuous tracking and graphically view policy compliance trends over a period of time. The visualization can include one or more graphs representing policy compliance posture, policy compliance trends, and the like.

Figure 14:
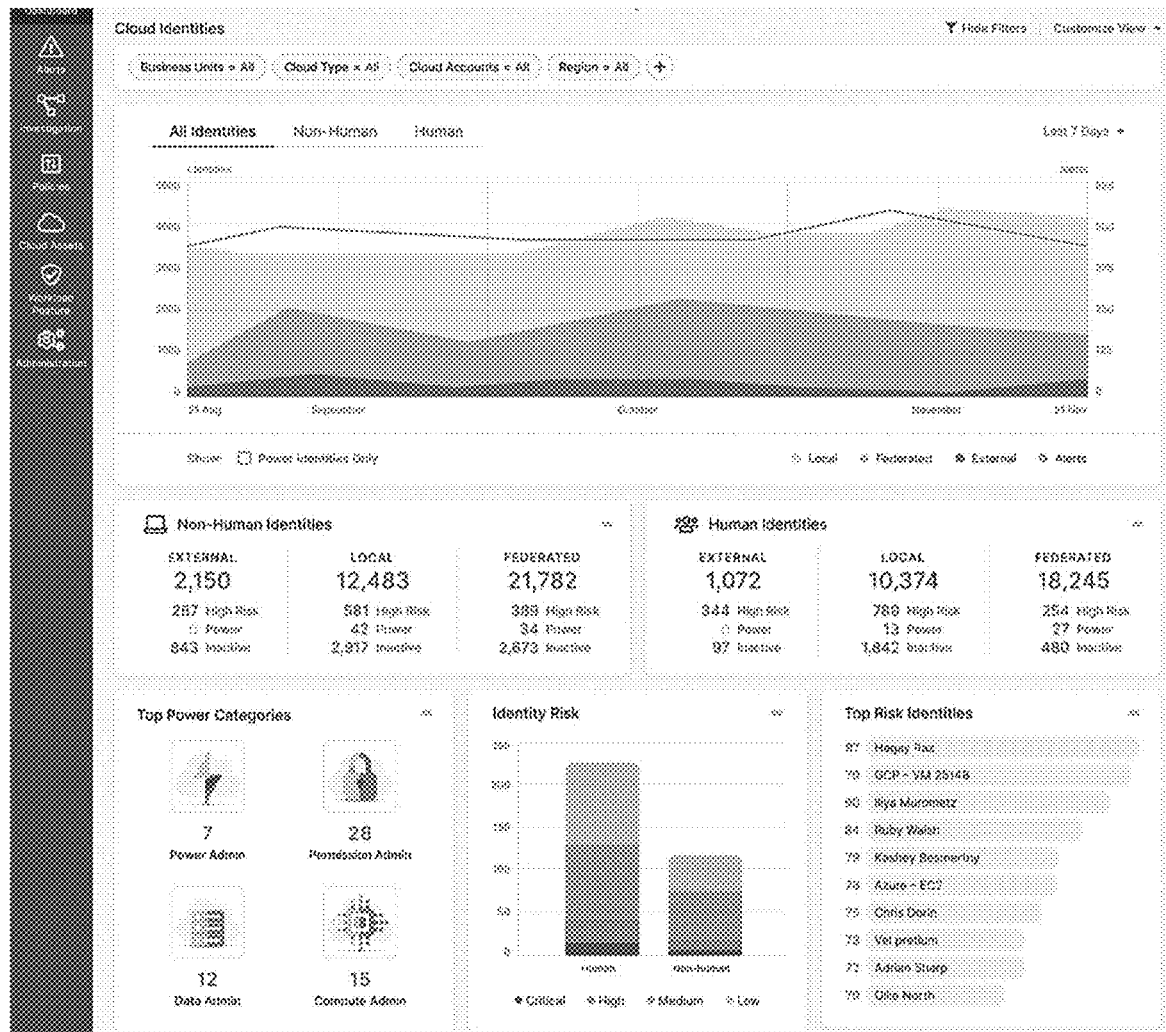
FIG. 14 is a screenshot of a GUI displaying a page for determining identity entitlements.

FIG. 14 is a screenshot of a GUI displaying a page for entitlement management and least-privilege enforcement. The data displayed in FIG. 14 includes a data enriched identity inventory for the cloud environment. This provides visibility of human and non-human identities, allows an understanding of identity origin for local/federated/external identities, and catalogs human and non-human identities by their permission levels in different accounts. Further, the data can allow easy detection of highly privileged identities and allow assessment of their permissions. All implicit and explicit entitlements can be identified. Also, excessive permissions assigned to non-human identities can be detected. A risk based prioritized view can allow visualization of only important high risk issues as well as identities which are considered high risk, thus reducing the number of alerts an operations team has to deal with.

Figure 15:
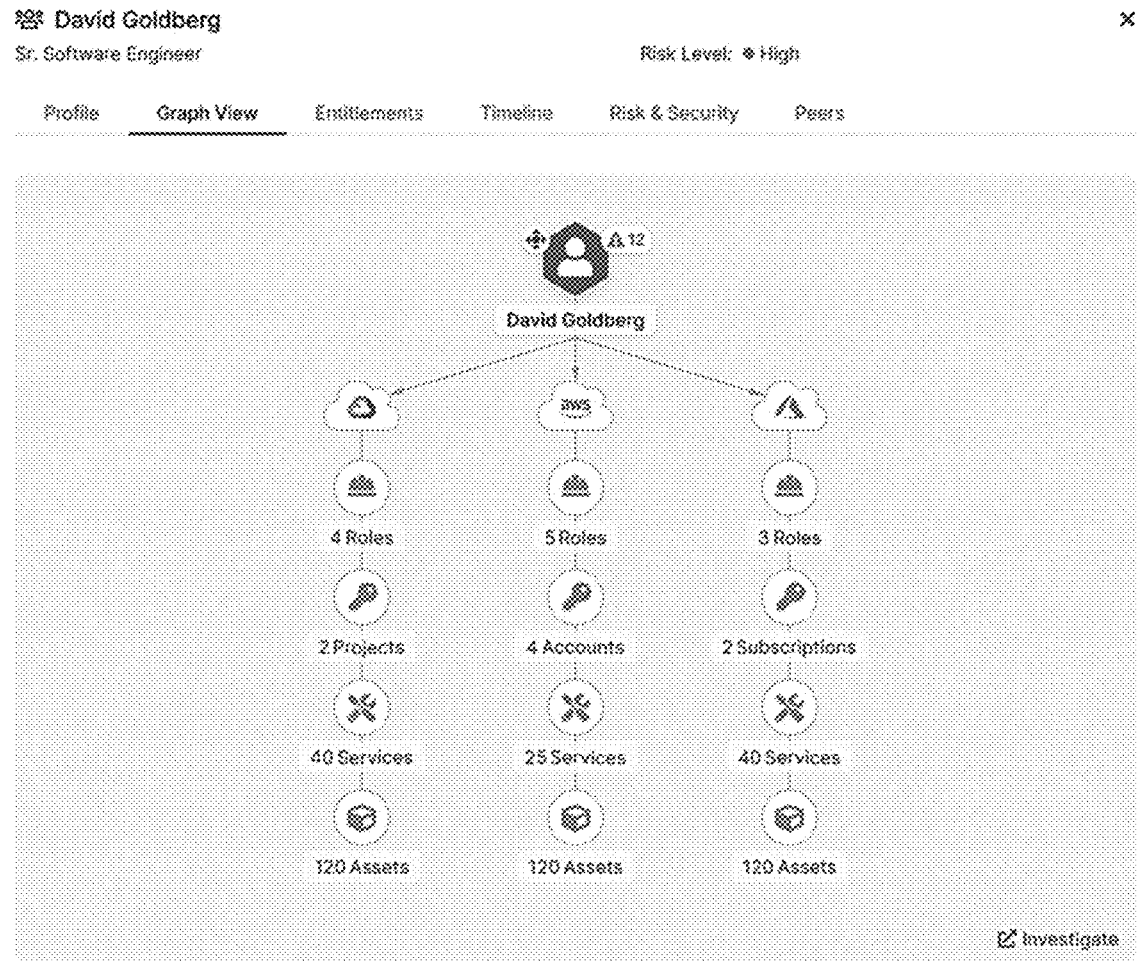
FIG. 15 is a screenshot of a GUI displaying a profile page for a specific identity.

FIG. 15 is a screenshot of a GUI displaying a page for determining identity entitlements. The identity shown in FIG. 15 can be considered a high risk identity. The identity has plurality of roles with access to multiple services and assets within multiple cloud environments. In various embodiments, an identity with such a high number of entitlements is considered high risk while other factors are considered as well.

Figure 16:
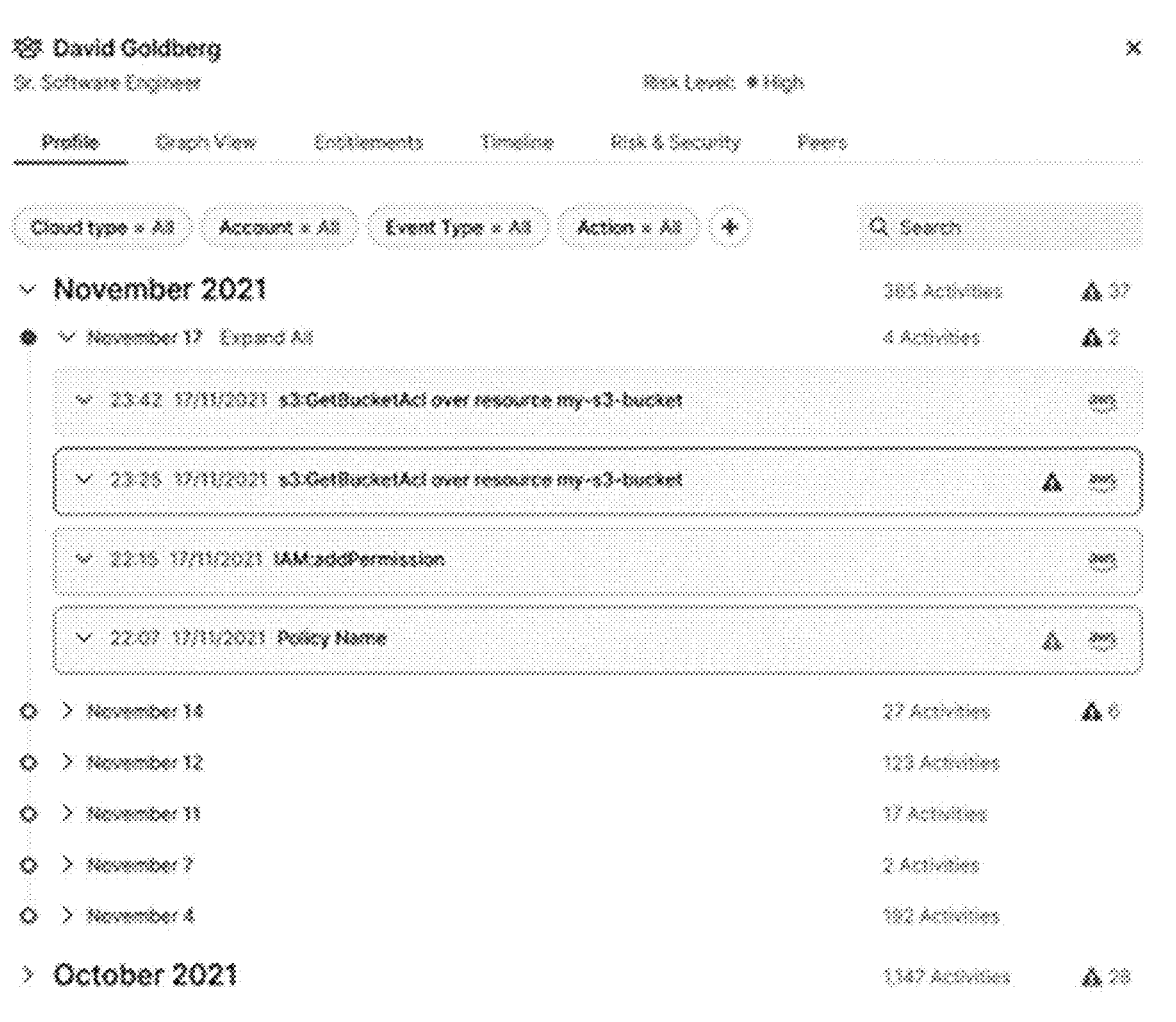
FIG. 16 is a screenshot of a GUI displaying a profile page for a specific identity.

FIG. 16 is a screenshot of a GUI displaying a profile page for a specific identity. The profile page provides various data associated with the identity. The data can include an activity timeline which provides insight into activities performed by the identity, entitlement/configuration changes applied to the identity, and any resulting alerts. Such insights provide a complete picture of an activity, such as who performed the activity, what activity was performed, when was the activity performed, and how was the activity performed.

Figure 17:
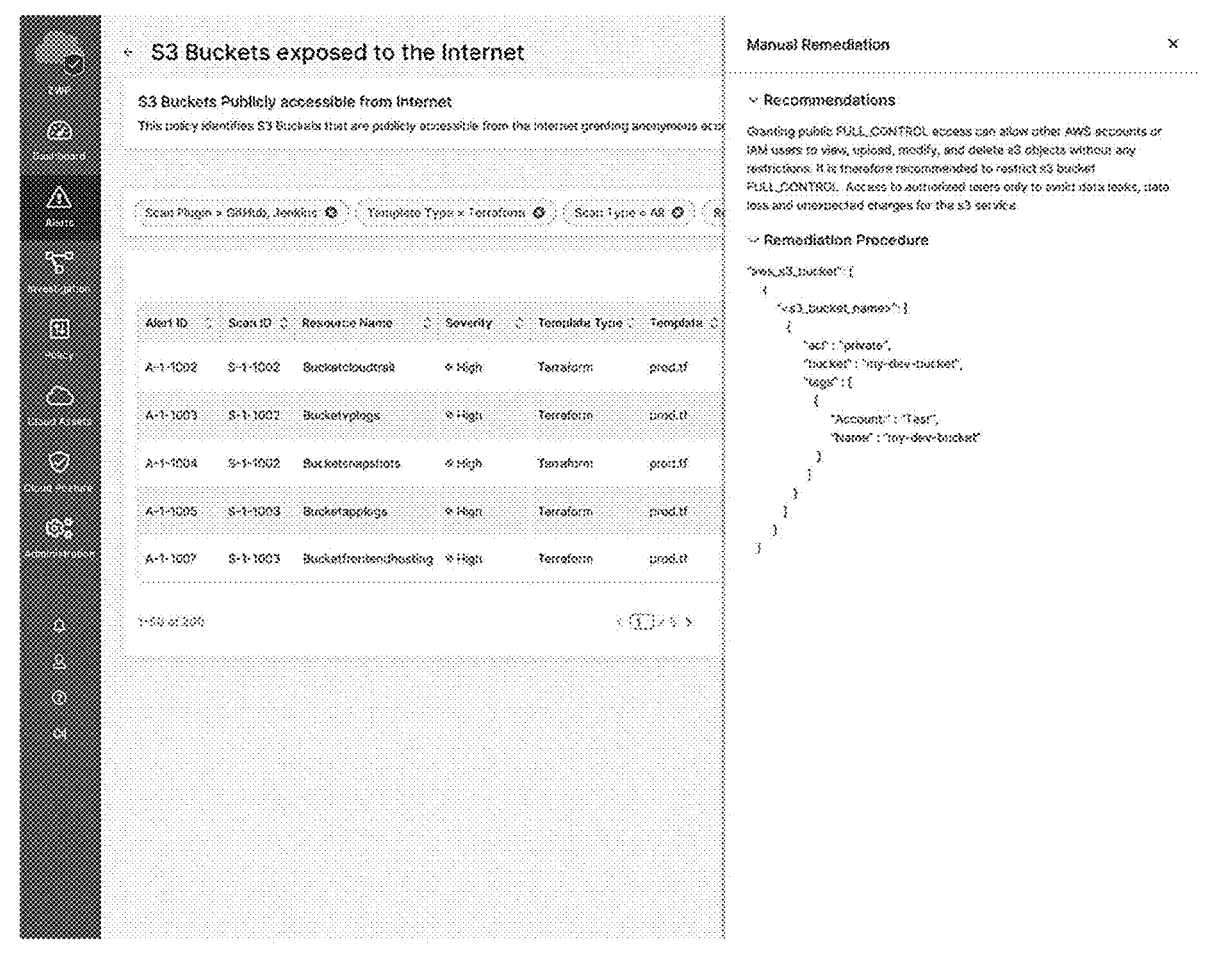
Figure 18:
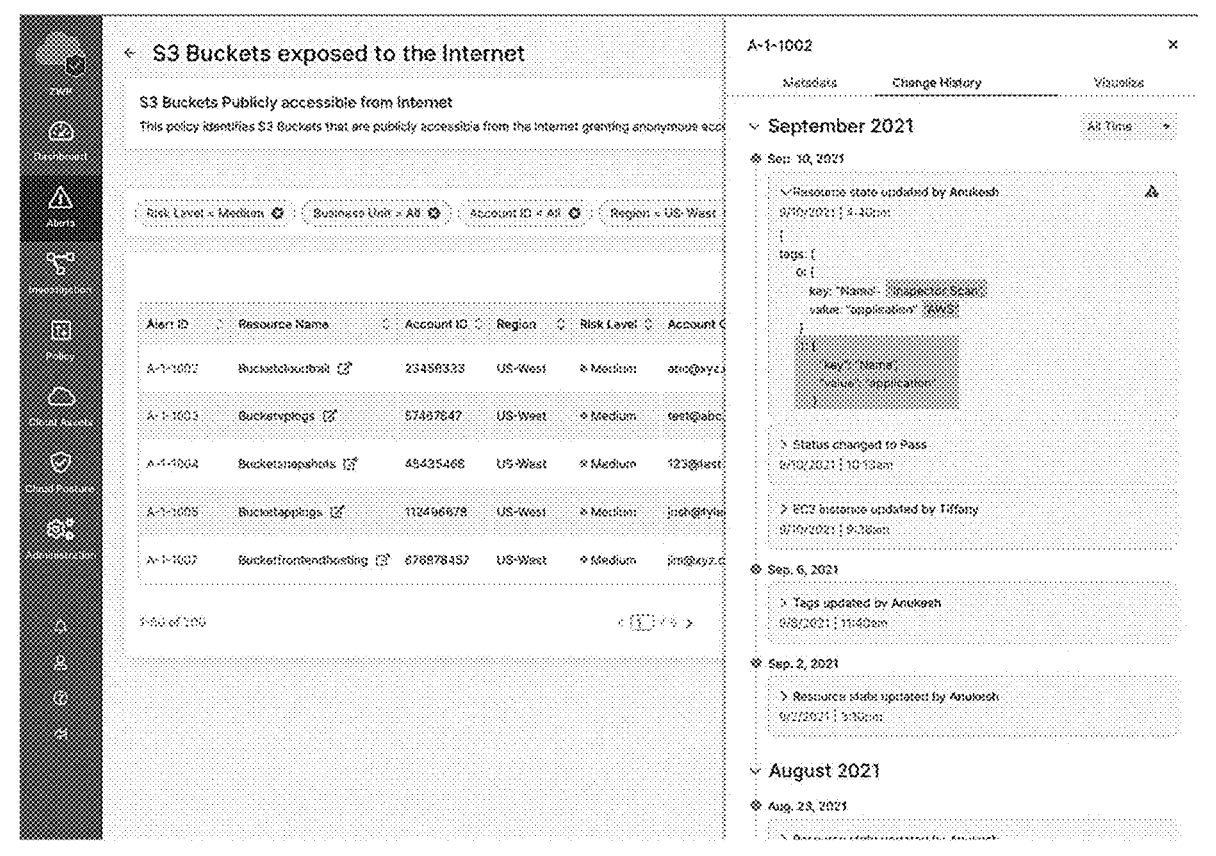

FIG. 17 is a screenshot of a GUI displaying build-time alerting and providing guided remediation. The display provides various alerts associated with one or more scanned plugins with associated risk level. It additionally provides a guide for remediation presenting a recommended remediation procedure. FIG. 18 is a screenshot of a GUI displaying run-time alerting and providing guided remediation. Similarly, the display provides various alerts with associated risk levels.

Figure 19:
FIG. 19 is a screenshot of a GUI displaying threat detection and risk prioritization.

FIG. 18 is a screenshot of a GUI displaying threat detection and risk prioritization. The visualization shown in FIG. 19 shows various security events and security exposures. The security events include a plurality of smart rules identifying various attack scenarios. These can be grouped by common security themes for ease of mapping of risky areas. This allows easy prioritization of urgent items for quick attention and remediation. An investigation path is further provided with complete details for each attack.

The security exposure provides complete security posture coverage and eliminates bombardment of alerts via smart policies for simple and advanced attack vectors. They can further be categorized for ease of access and follow-up.

Posture Control Process

Figure 20:
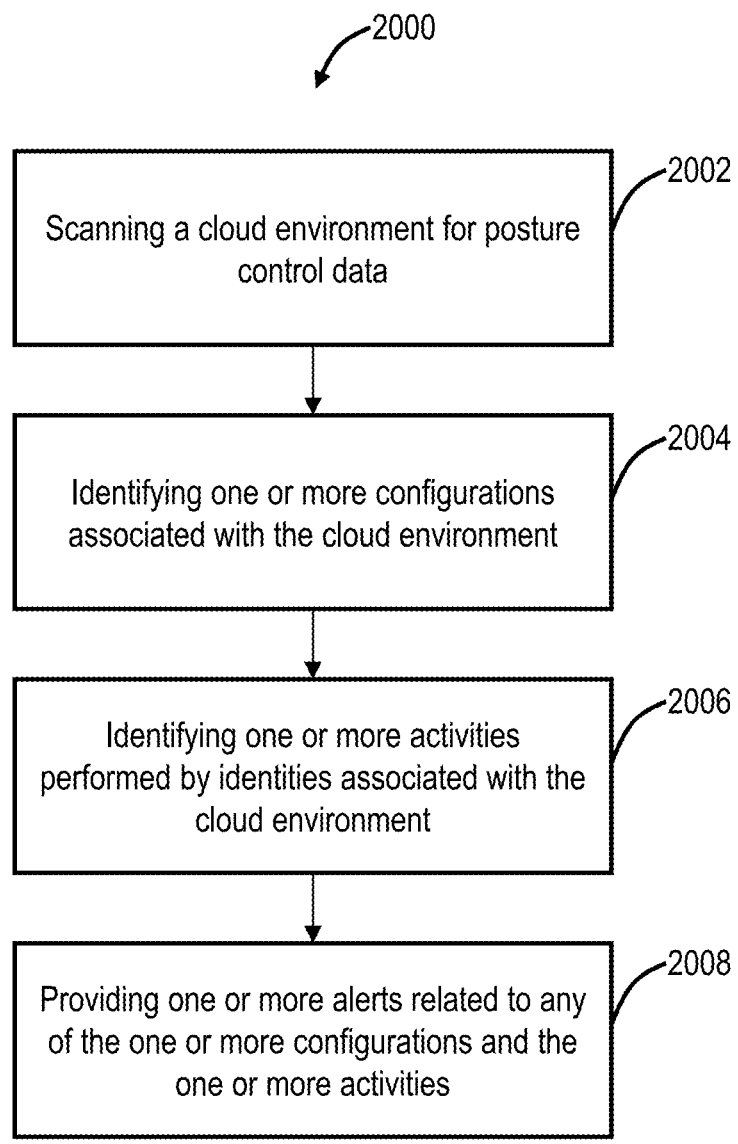
FIG. 20 is a process of posture control for cloud environments.

FIG. 20 is a process 2000 of posture control for cloud environments. The process 2000 includes steps of scanning a cloud environment for posture control data (step 2002); identifying one or more configurations associated with the cloud environment (step 2004); identifying one or more activities performed by a plurality of identities associated with the cloud environment (step 2006); and providing one or more alerts related to any of the one or more configurations and the one or more activities (step 2008).

The process 2000 can further include wherein the one or more alerts include alerting to a combination of a misconfiguration and an activity as a risk. The posture control data can include any of assets, identities, network flow logs, activities, and code repositories in the cloud environment. The cloud environment can be any of a run-time cloud environment and a build-time cloud environment. Prior to the scanning, the steps can further include configuring one or more discovery modules. The posture control data can include any of historical data and real-time data. The steps can further include providing a Graphical User Interface (GUI) displaying the identified configurations and activities. The GUI can include a graphical representation of policy compliance trends in the cloud environment. The GUI can include a timeline of activities associated with any identity of the plurality of identities. The GUI can further include a risk level associated with each activity in the timeline.

Agentless Vulnerability Scanning

The present disclosure provides agentless vulnerability scanning of workloads (Virtual Machines (VMs)) present in cloud environments. Such cloud environments can be provided by various cloud providers such as Amazon Web Services (AWS), Microsoft Azure, Google Cloud Platform (GCP), and the like. Currently, in many organizations, legacy methods are followed by installing agents in the workloads to detect vulnerabilities. These methods introduce many issues inherent to legacy approaches, hence, the present disclosure proposes a completely agentless approach which solves the issues of agent based methods.

Typically, in a cloud environment, enterprises are required to install agents in VM instances to perform vulnerability scanning. These installed agents are adapted to run vulnerability scans on the VM instances and provide the results. These enterprises who are dependent on agent-based vulnerability scanning face a variety of problems related to these agent-based solutions. These problems include installing the agents in all of the virtual instances in the public cloud, which is a cumbersome process and requires a dedicated Information Technology (IT) team to install and manage the agents. Similarly, it is exceedingly difficult to perform upgrades of the installed agents. Additionally, it is difficult to achieve 100% coverage with agent based scanning and an agent running in a VM is capable of consuming large amounts of resources (i.e., memory, CPU, etc.) of the VM in order to perform its functions.

The present disclosure provides systems and methods to address the problems faced by enterprises in the case of agent-based vulnerability scanning. To address these problems, various embodiments provide agentless vulnerability scanning of VMs in cloud environments. By utilizing the agentless vulnerability scanning systems, enterprises are not required to set up multiple agents, and IT teams are no longer required to manage agents in a public cloud environment. Further, since it is agentless, no process runs on the VM and 100% coverage of VMs is possible in customer public cloud environments. The present systems further include added features such as, once vulnerabilities are detected, the agentless vulnerability scanning can provide remediation to address the potential vulnerabilities that are present in operating systems and other packages.

Figure 21:
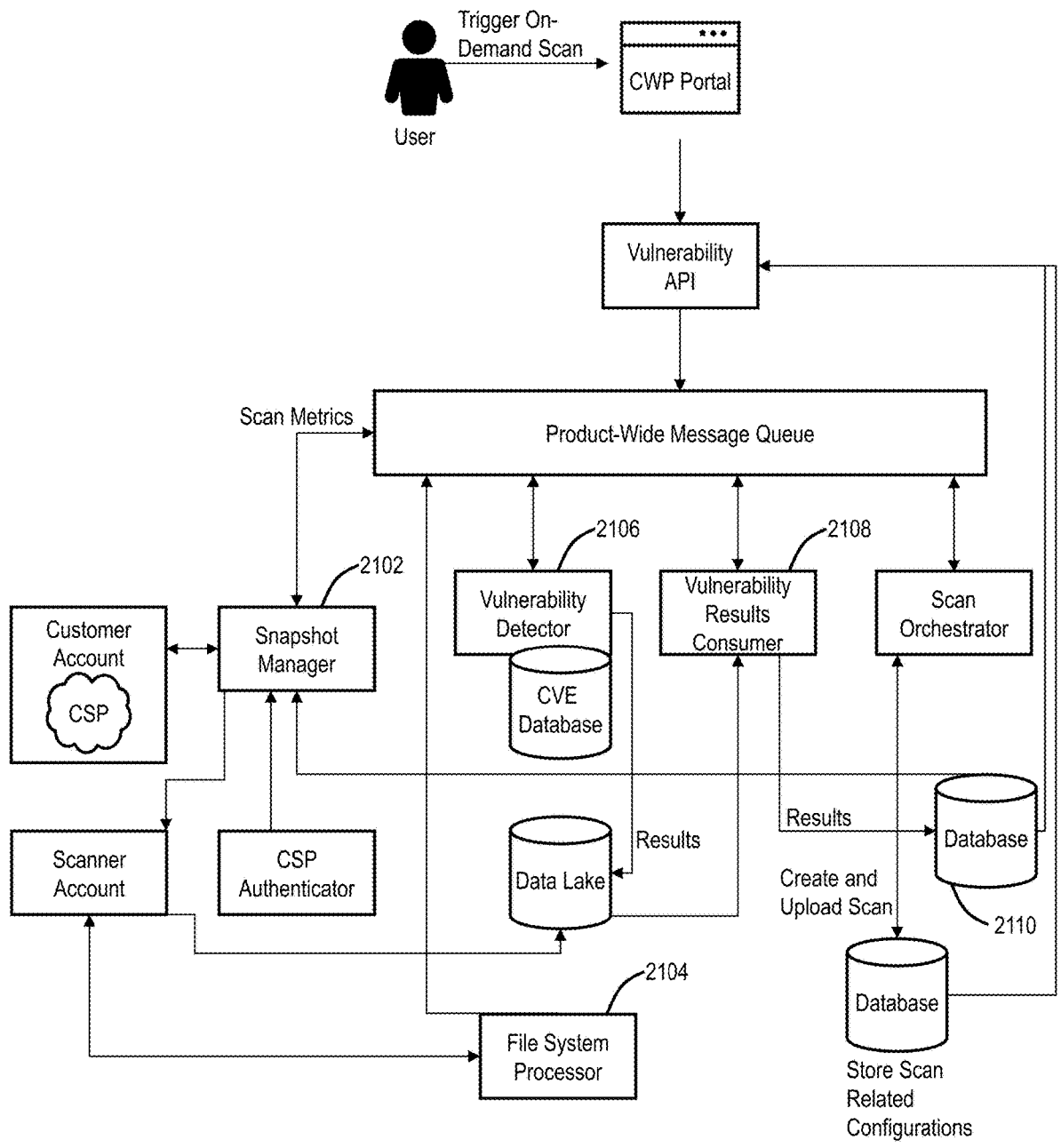
FIG. 21 is a flow diagram of an agentless vulnerability scanning system.

FIG. 21 is a flow diagram of an agentless workload vulnerability scanning architecture. In various embodiments, the present systems and methods can be configured as part of the posture control systems described herein. A posture control agentless vulnerability scan of workloads can be achieved with various components. These components include a snapshot manager 2102, a file system data processor 2104, a detector 2106, and a results processor 2108. The snapshot manager 2102 is utilized for creating snapshots of the virtual instances (virtual machine) for which agentless scanning is being performed. That is, the snapshot manager 2102 is adapted to create a snapshot of a virtual machine in order to preserve the state and data of the virtual machine at a specific point in time. The state can identify a power state, i.e., if the virtual machine is powered on, off, or suspended. Further, the data collected from the snapshot can include any files making up the virtual machine, in addition to any posture control data described herein associated with the virtual machine. The state and data of a virtual machine can further be referred to as workload data. In various embodiments, the step of creating the snapshot of the workload can be configured similarly to the discovery module configurations described herein.

Systems are adapted to store the workload data collected from a virtual machine in a database, wherein the workload data associated with specific virtual machines can be accessed as required. The file system data processor 2104 is used to analyze the workload data which is created out of the snapshot to identify characteristics of the workload, the characteristics including the operating system and packages present in the workload. The detector 2106 is used to identify the vulnerabilities present in the disk by correlating the operating system and package information extracted by the file system data processor 2104. In an embodiment, this detector 2106 can operate as described in previous sections of the present disclosure to identify misconfiguration issues of a workload to provide risks assessment and recommended remediation. Finally, the results processor 2108 persists the results in a database 2110 once vulnerabilities are identified. The results (identified vulnerabilities) can be persisted on a per-workload basis in order to allow easy retrieval of said results. The results are made available to a user via a UI, such as the UI described in previous sections herein. The UI can be adapted to display the identified vulnerabilities in addition to providing steps describing various remedial actions to correct any misconfigurations causing the vulnerabilities.

The present processes improve security by enabling regular security scanning to identify potential security vulnerabilities in code, allowing teams to remediate them before they can be exploited. Further, the present systems provide consistency and repeatability because posture control vulnerability feeds are refreshed daily to keep track of latest vulnerabilities released by National Vulnerability Database (NVD) and other vendors of the like. Recurring Scans on the workloads ensure the latest vulnerabilities are detected immediately after vulnerabilities are published. Overall, the posture control agentless vulnerability scanning helps enterprises improve security and prevent exploitation of their cloud infrastructure. Additionally, the various steps can be performed in response to a user initiated trigger, as shown in FIG. 21, or based on an automated schedule. Such an automated schedule can be configured through the various GUIs described herein.

Agentless Vulnerability Scanning Process

Figure 22:
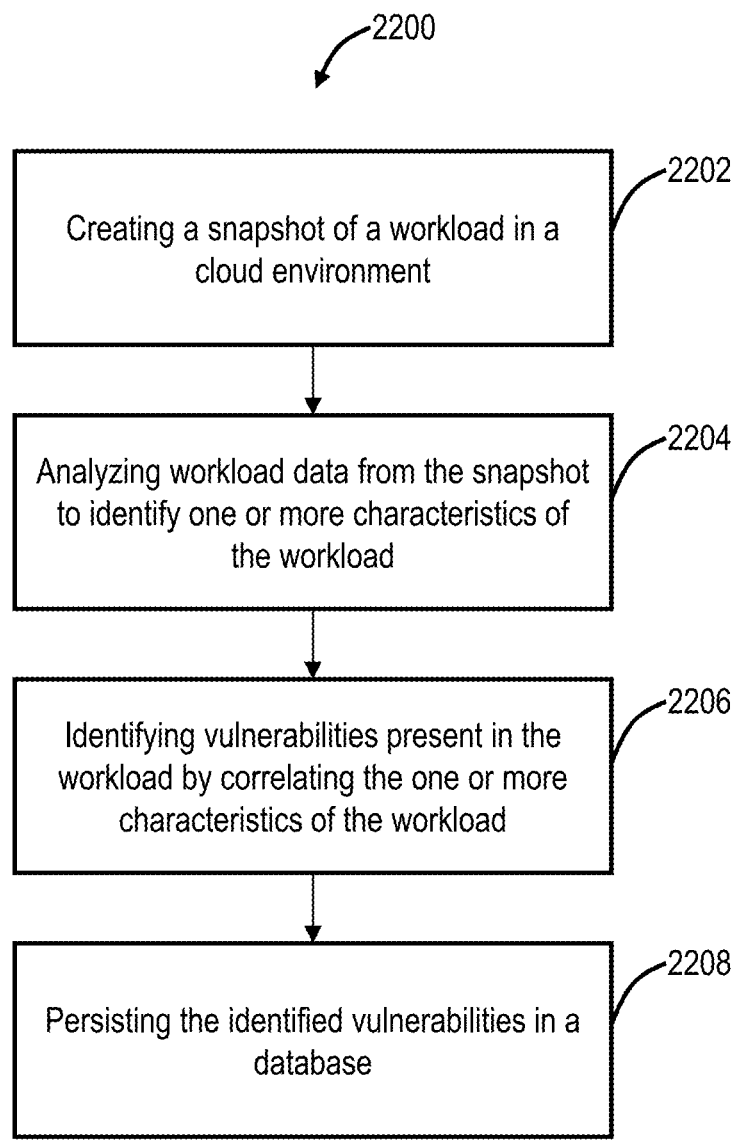
FIG. 22 is a flow chart of a process 2200 for agentless vulnerability scanning.

FIG. 22 is a flow chart of a process 2200 for agentless vulnerability scanning. The process 2200 includes creating a snapshot of a workload in a cloud environment (step 2202); analyzing workload data from the snapshot to identify one or more characteristics of the workload (step 2204); identifying vulnerabilities present in the workload by correlating the one or more characteristics of the workload (step 2206); and persisting the identified vulnerabilities in a database (step 2208).

The process 2200 can further include wherein the workload is a virtual machine instance. The virtual machine instance can be associated with one of a plurality of Cloud Service Providers (CSPs). The identified vulnerabilities are persisted in the database on a per-workload basis. Prior to the creating, the steps can include configuring one or more discovery modules. The one or more characteristics can include any of an Operating System (OS) of the workload and packages present in the workload. The steps can be performed in response to a user initiated trigger or based on an automated schedule. The steps can further include providing a Graphical User Interface (GUI) for displaying the identified vulnerabilities. The GUI can include actionable steps describing how to remediate the identified vulnerabilities. The GUI can include a risk level associated with each identified vulnerability.

Remediation Scoring

Currently, cloud security systems such as the various posture control systems described herein generate a large number of alerts for every customer, which can lead to alert fatigue. These alerts can often amount to thousands and even tens of thousands of alerts based on the cloud provider customers cloud environment. The result is that customers have difficulty deciding where to focus their efforts and what actions to take to reduce the risks in their cloud environment. Various embodiments of the present systems and methods can provide insight reports to let cyber security managers take a higher-level view of their environment in order to help administrators/security managers to understand the overall strengths and weaknesses of their cloud environment and prioritize the most efficient processes to reduce risk.

The present systems can provide an insight report to recommend the most effective remediation strategies to reduce the risk associated with the cloud environment and evaluate the top risks and strengths of the environment using scoring algorithms. The systems can achieve these goals by processing varied data that is collected and generated by the posture control systems such as: assets, identities, data enrichment pipelines (public exposure, power score, etc.), vulnerability scanning, etc. In an embodiment, the insight report includes various sections including an overview, risks and strengths, and top remediations. Each section is generated automatically using algorithms that are based on the above-mentioned data.

Figure 23:
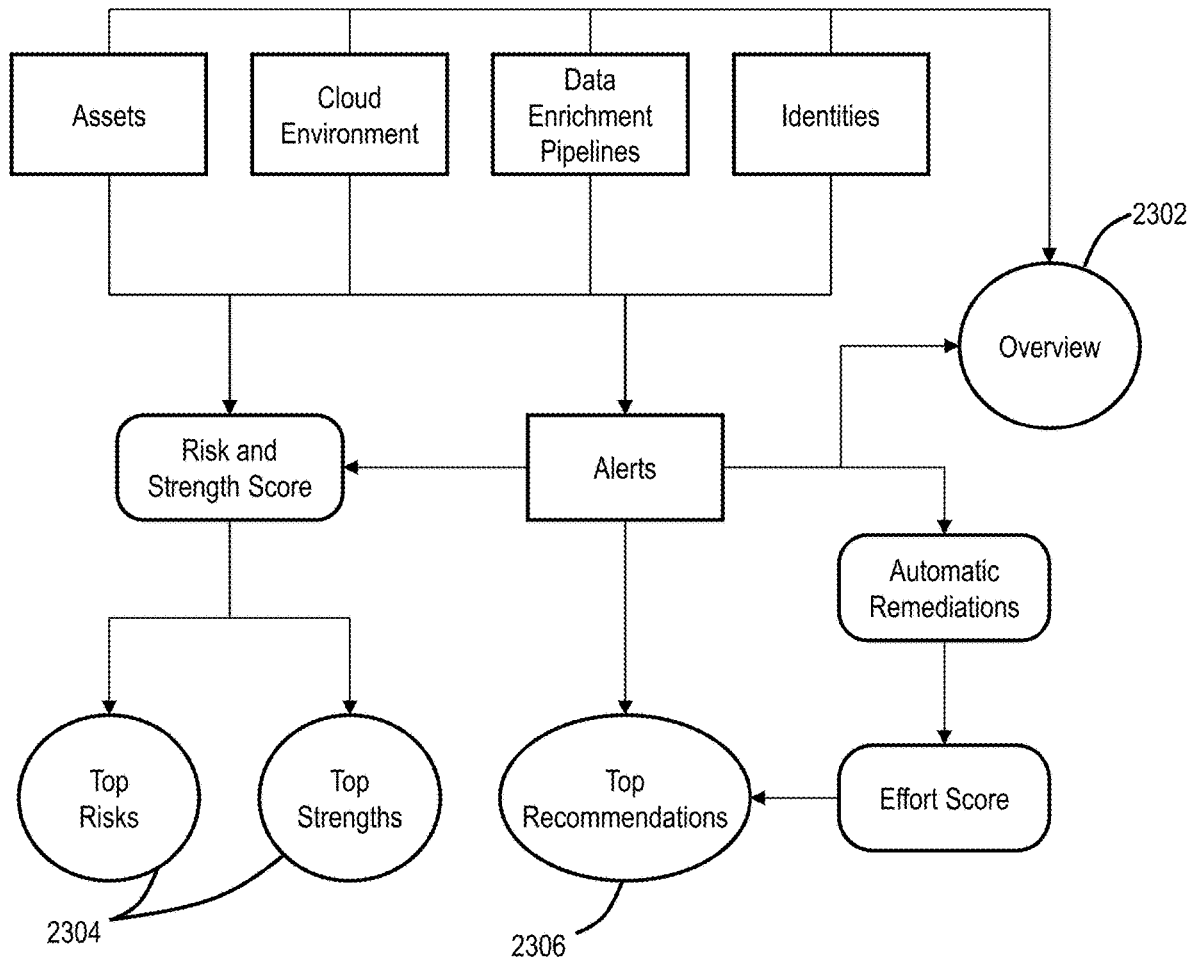
FIG. 23 is a flow diagram demonstrating a high-level process of creating the insight report and remediations scoring.

FIG. 23 is a flow diagram demonstrating a high-level process of creating the insight report and remediations scoring. It will be appreciated that each section, i.e., the overview 2302, top risks and strengths 2304, and top recommendations 2306, can be created individually by different systems and/or as one process. In an embodiment, the overview 2302 presents the key attributes of the customers cloud environment across all different cloud service providers. That is, the overview 2302 presents the distribution of identities and resources among cloud providers, cloud identities, cloud resources, security alerts generated by posture control systems, etc. The main purpose of the overview 2302 is to allow customers to understand the general structure of their cloud environment and give context to the other sections of the report, i.e., the top risks and strengths 2304, and the top recommendations 2306. This information helps the customer have an holistic view of their environment that is larger than the scope of a single cloud account, organization, or even cloud provider and is enriched by capabilities of posture control such as public exposure, permissions calculations, vulnerability findings, and alerts generated. An example of the overview 2302 is shown below for a customer.

Overview:
    Distribution of identities and resources among cloud providers
      Identities:
        6023 identities in 51 AWS accounts
        64,858 identities in 2 Azure organizations
        1161 identities in 79 GCP accounts
      Resources:
        31,684 resources in 55 AWS accounts
        3106 resources in 4 Azure organizations
        904 resources in 111 GCP accounts
    Identities (72,042 total).
      30 identities with critical alerts 1873 high privileged identities (2%)
17,225 external identities
  65 are high privileged
Resources (35,694 total)
  1100 resources with critical alerts
  1672 publicly exposed resources
  1503 resources with high privileged role.
  1155 resources with critical vulnerabilities
Alerts (44,864 total).
  12 different types of critical threat alerts, amounting to 1447 total open alerts in total
  1431 open critical alerts were created more than 14 days ago and not resolved
  27,931 open compliance alerts That is, in various embodiments, the overview 2302 can include a distribution of identities and resources among cloud providers which highlights the number of identities and resources in each cloud provider. The overview 2302 can also include details associated with identities, resources, and alerts. Within these categories the present systems can display identities with critical alerts, high privileged identities with a percentage thereof, external identities, high privileged identities, resources with critical alerts, publicly exposed resources, resources with high privileged roles, resources with critical vulnerabilities, the number of different types of critical threat alerts, a number of open critical alerts that were created more than a specified amount of time ago and not resolved, open compliance alerts, etc.

The risks and strengths 2304 section presents the most meaningful risks and strengths of the customer's cloud environment in various categories including attack surface, permissions, and authentication. The main purpose of this section is to help the customer understand what the major strengths and weaknesses of their environment are. This information assists in understanding where to focus improvement efforts, i.e., what are the bad and good habits of the personnel who set up the environment. In various embodiments, the top risks and strengths are calculated by the following steps.

Figure 24:
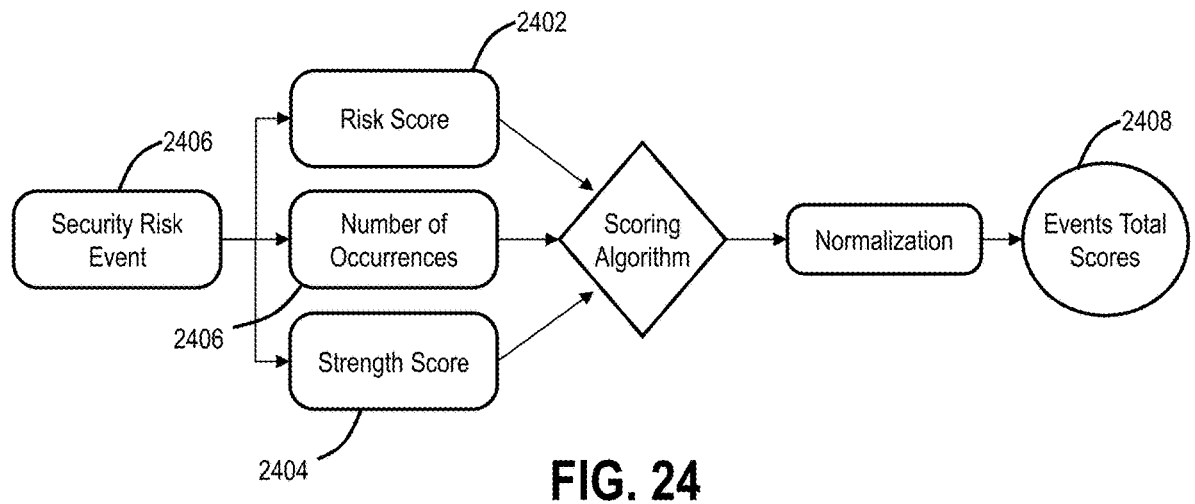
FIG. 24 is a flow diagram of a process for calculating top risks and strengths in cloud environments.
Figure 25:
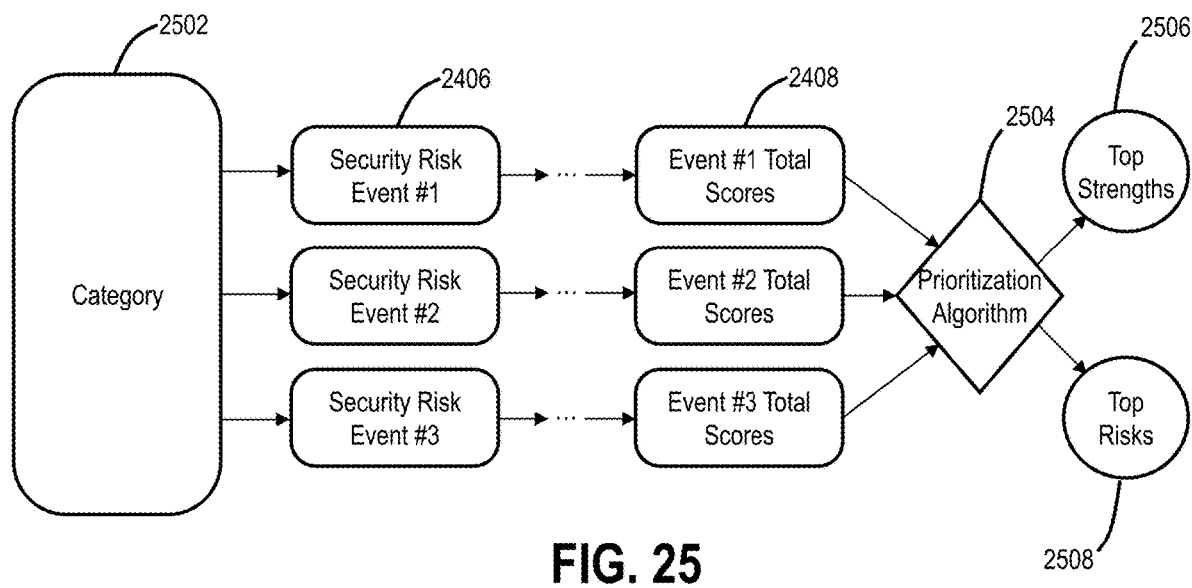
FIG. 25 is a flow diagram of a process for calculating top risks and strengths in cloud environments for a whole category.

FIG. 24 is a flow diagram of a process for calculating top risks and strengths in cloud environments. FIG. 25 is a flow diagram of a process for calculating top risks and strengths in cloud environments for a whole category. Each category 2502 is divided into security risk events 2406. Each security risk event 2406 is given 2 scores between 0-5000. Risk score 2402 relates to how much potential risk to a cloud environment a large number of occurrences of the event poses. Strength score 2404 relates to how much potential risk to a cloud environment is being avoided by having a small number of occurrences of the event. Also collected is the number of occurrences 2406 of each risk event in the customer's cloud environment. For each event, the risk and strength score for the specific environment is calculated by using a formula that is based on the events' risk and strength scores and the environment's size. A prioritization algorithm 2504 is run in order to decide which are the most meaningful risks and strengths based on the events' total scores. It will be appreciated that the process shown in FIG. 25 includes the steps of FIG. 24 between the security risk event 2406 step and the event total scores 2408 step. By utilizing these steps, the systems can calculate the most meaningful risks and strengths based on the amount of occurrences of each event.

An example of how the present systems display the top strengths 2506 and top risks 2508 are shown below.
Top Strengths:
  Attack surface
    No publicly exposed storages.
    None of the publicly exposed resources are high privileged
  Permissions
    No high privileged resources
  Authentication
    No high privileged identity can authenticate via access keys
Top Risks
  Attack surface
    4 publicly exposed serverless functions
  Authentication
    9 high privileged identities can authenticate via access keys Another section of the insight report is the top remediations. This section displays the most efficient remediation efforts that the customer can initiate in order to reduce their risk. In an embodiment, the most efficient remediations are the ones that solve the most amount of risk for the lowest effort/cost. The purpose of this section is to give the customer practical processes that they can initiate in order to reduce their risk for the least amount of effort. This information helps to prioritize remediations based on their value and efficiency, which is not possible with traditional methods when looking at thousands of alerts.

Figure 26:
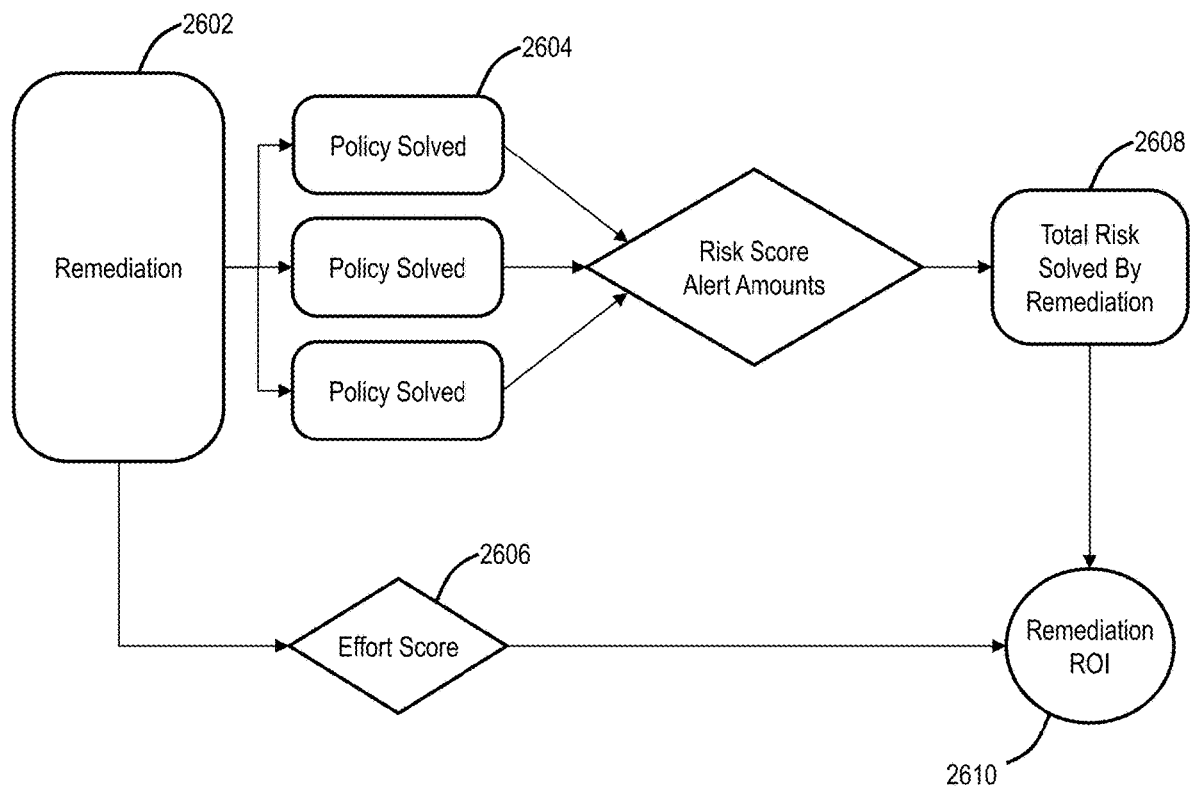
FIG. 26 is a flow diagram demonstrating the Return On Investment (ROI) calculation of a single remediation.

FIG. 26 is a flow diagram demonstrating the Return on Investment (ROI) calculation of a single remediation. In various embodiments a higher ROI score can be associated with a remediation that solves the most threats/alerts/policy for the least amount of effort. The top ROI remediations can be based on posture control correlated threat policies. For each correlated threat policy, the systems can list the possible remediations that could solve it. it can then map each remediation 2602 to all policies 2604 it can solve. Each remediation is given an effort score 2606 between 0-5 based on how difficult it is for an administrator to execute the remediation 2602. That is, the present systems and methods can include assigning an effort score to each of the remediations, wherein the effort score is based on how difficult it is to execute the remediation. Each threat policy 2604 is given a risk score between 10-10000 based on its severity and the amount of alerts generated by each policy is collected. For each policy 2604, the systems calculate the total risk it poses for the specific environment. For each remediation, the risk it solves is calculated based on the mapping of the remediation 2602 to the policies 2604, i.e., the systems calculate an amount of risk solved by each of the remediations. The systems can then calculate the most efficient remediation based on the remediation's risk solved 2608 and effort score 2606. The systems can then calculate the ROI score 2610 associated with each remediation 2602 and can later choose the remediations with the highest ROI score and lowest effort to present to the administrator as the best option. It will be appreciated that the same policy can be solved by several remediations.

An example of how the present systems display the top remediations is shown below.
Top ROI Remediations:
  Delegating permissions according to the least privileges principle for serverless functions
  Enforce Multi-Factor Authentication (MFA)
  Periodically rotate access keys every 90 days
  Implementing the above will reduce the environments risk by 81.5%

In various embodiments, the systems can provide the top remediations as a list sorted by their calculated ROI. The various steps required for performing the remediations can also be displayed as well as the percentage of environment risk reduction associated with each remediation. The displaying of such information, including the overview 2302, top risks and strengths 2304, and top remediations/recommendations 2306 can be displayed via the various GUIs described herein.

The following is a list of example remediations, wherein each of the remediations can be scored based on various factors that are assigned weights, the factors can include how generic the remediation is, the backwards compatibility of the remediation, and the cost of the remediation in order to arrive at a final score for the systems to determine which remediations are most efficient. The list of remediations can include, but is not limited to:

- Delegating permissions according to the least privilege principle-compute instances.
- Only allow necessary access to the storage resource.
- Delegating permissions according to the least privilege principle-serverless functions.
- Delegating permissions according to the least privilege principle-identity.
- Consider network restriction to limit the direct internet connections.
- Update compute instances with the latest patches and security updates.
- Make sure the external identities that can assume the role are trustable.
- make sure the external identity belongs to a trusted domain.
- Use bastion server or a third-party remote connection solution to remotely connect to the compute instances without exposing management ports.
- Make sure the KMS key absolutely needs to be used by anyone.
- Change the role policy so it would not be allowed to be assumed by anyone.
- Ensure that additional credentials are required for the identity.
- Review the direct invoke methods of the serverless function.
- revoke the role that grants this permission-compute instance.
- revoke the role that grants this permission-serverless functions.
- revoke the role that grants this permission-identity.
- Initiate a process to disable access to stale snapshots by high-risk identities.
- require authentication for serverless functions.
- change the storage encryption key to a key that is owned by an account in your organization.
- Enforce MFA authentication.
- Initiate a process to disable unused access keys.
- Disable login for dormant identities.
- Enforce IMDSv2 for the compute instances.
- Periodically rotate access keys every 90 days.
- Enable security controls against ransomware attacks for storage services, such as versioning or MFA-deletion.
- Investigation.
- Separate the user into 2 users with different authentication methods.
- Set an expiration time for the authentication method.
- Remove the specific risky permission.
- Replace the access keys with a safer authentication method.
- Remove the malware from the S3 bucket.
- Enforce hardware MFA for super admin accounts.
- Enable flow logs.
- Enforce block-public-access control for private buckets.
- Block login using project SSH keys.
- Change the identity key to a key that is owned by an account in your organization.
- Disable the use of HTTP.
- Replace the risky role with a role with the specific permissions needed for the resource.

The present systems and methods are configured to calculate the most efficient remediations to reduce cloud environments' risks, calculate a cloud environment's biggest risks and weaknesses, and provide a holistic overview of a cloud environment across different service providers.

Process for Remediation Scoring

Figure 27:
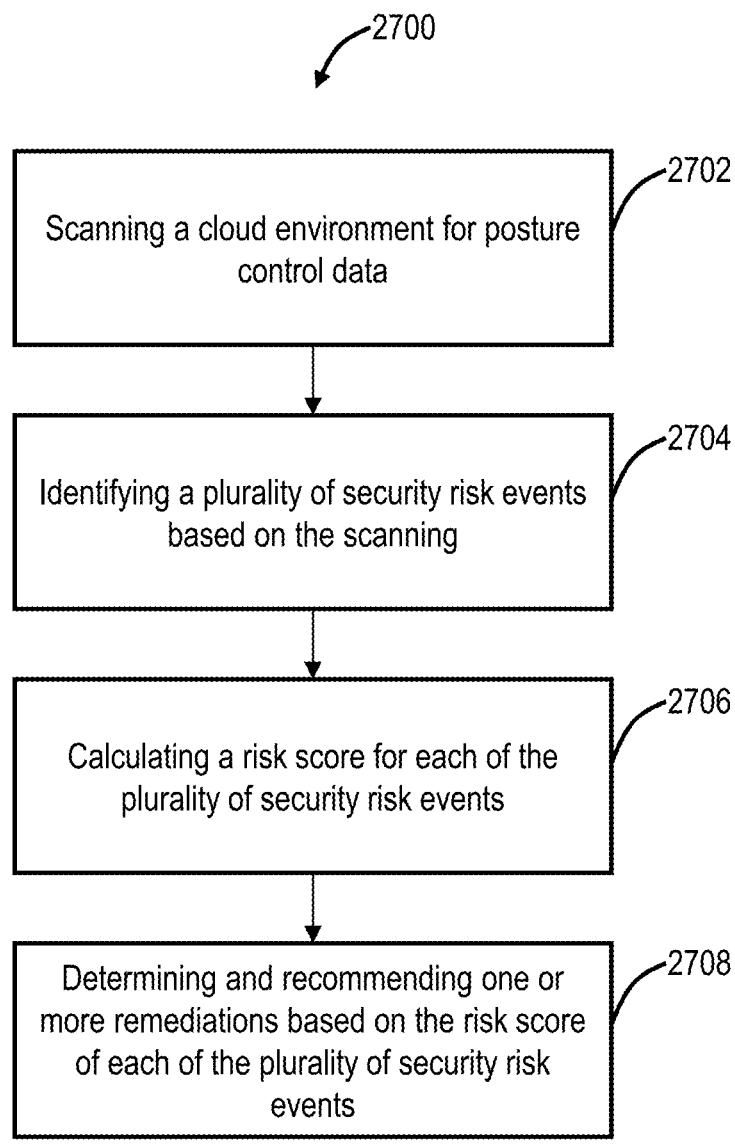
FIG. 27 is a flowchart of a process for remediation scoring.

FIG. 27 is a flowchart of a process 2700 for remediation scoring. The process 2700 includes scanning a cloud environment for posture control data (step 2702); identifying a plurality of security risk events based on the scanning (step 2704); calculating a risk score for each of the plurality of security risk events (step 2706); and determining and recommending one or more remediations based on the risk score of each of the plurality of security risk events (step 2708).

The process 2700 can further include calculating a total event score for each of the plurality of security risk events, wherein the total event score is based on the risk score, a strength score, and a number of occurrences; identifying one or more top risks and one or more top strengths based on the total event score of each of the plurality of security risk events; and determining one or more remediations based on the one or more top risks. The steps can further include calculating an amount of risk solved by each of the one or more remediations. The steps can further include assigning an effort score to each of the one or more remediations, wherein the effort score is based on how difficult it is to execute the remediation. The steps can further include calculating a Return on Investment (ROI) score for each of the one or more remediations based on an amount of risk solved by each of the one or more remediations and an effort score of each of the one or more remediations. The steps can further include displaying the one or more remediations via a Graphical User Interface (GUI). The one or more remediations can be displayed based on the ROI score of the one or more remediations. The steps can further include displaying any of an overview, top risks, top strengths, and top recommendations associated with the cloud environment. The overview can include a distribution of identities and resources associated with a plurality of cloud providers. The posture control data can include any of historical data and real-time data.

Identity Power Score

The present disclosure provides systems and methods for an identity power scoring system that assigns each identity in a cloud environment or cloud-based system, human or non-human, a score of 0-100, signifying how privileged the identity is in the context of a cloud account. The scoring system helps identify and prioritize risk associated with specific identities, allowing more optimized methods of protection for information in the cloud-based system. In addition, the identity is scored 0-100 in categories such as compute admin, secret admin, storage admin, and others of the like. it will be appreciated that the power score range can be any range, and the exemplary power score range of 0-100 is a non-limiting example.

Identities in a cloud environment or cloud-based system are varied and are used in various access scenarios, such as root accounts for extremely privileged tasks, Identity and Access Management (IAM) users with access keys for routine scripts, Elastic Compute Cloud (EC2) instances with roles, etc. Each of these identities can be assigned permissions in various different ways such as policies, group policies, inline policies, assumed roles, etc. To detect risk in a public cloud, it is critical to identify powerful users. For example, an EC2 instance that is publicly exposed and attached is a powerful role.

The scoring system helps to assess the power of an identity in the following manners. All cloud entitlements for any given identity are expended (action×resource) and calculated considering roles, policies, guardrails, deny policies, etc. Each entitlement is classified to its category such as compute, storage, etc. For each cloud account in scope, systems calculate all the possible entitlements for that account (unique action×resource pairs). Thus, the present systems and methods fully expand the span of what is possible to be done with a particular cloud account, followed by what is possible to be done by this cloud account for each category. For each identity with permissions/entitlements, systems calculate what the percentage is of the entitlements the identity has, in relation to the possible entitlements in the cloud account. This generates a value of Pe. Combining domain expertise, methods select the critical entitlements, and a result is a power score greater than or equal to the Pe value. The present disclosure enables systems to identify privileged human identities and enforce authentication controls, identify over privileged non-human identities, discover hidden admins, and govern permission drifts.

Given a customer environment with identities that have access to their cloud resources, the present systems and methods have the ability to score how powerful an identity is. This power should be expressed in a score (i.e., 0-100). For example, a global admin in Azure, or the root user in an Amazon Web Services (AWS) account, will have a score of 100. In contrast, an identity without any permissions (i.e., can only login to the console) will have a power score of 0. The purpose of this power score is to provide the score as a token that can be used in custom rules. For example, systems can define a rule that alerts to any user with score greater than 80 (or any other threshold) that is not enrolled with Multi-factor Authentication (MFA), or other security features of the like. The score can help assess the severity of an incident/risk that involves an identity. For example, the severity of old access keys for identities will depend on the identity's power score (i.e., category power score or global power score). The score also provides a way for customers to sort and view their most powerful identities. It will be appreciated that in examples such as AWS, roles can be assigned power scores in addition to identities.

Various embodiments of the present disclosure aim to help identify a risk associated with users/accounts. While "super-users" are relatively easy to detect, the range of other users in between becomes more difficult to detect/sort without understanding the context of the access. For example, data access may be critical in case of sensitive data, or almost meaningless in case of static, publicly available data. The same goes to workloads and systems. As such, given the entitlements and access of an identity, it is complicated to measure how powerful an identity is, relatively to the use case of a customer.

Various embodiments take advantage of the fact that systems/services have full visibility into the net identity's entitlements to calculate the following parameter of Pe. In short, Pe measures the percentage of entitlements an identity has, in relation to all the possible entitlements in the scope. In that context, all possible entitlements refer to all unique combinations (of action×resource) that can be found in the entitlements in that scope (ignoring grant path and identity elements). The scope can be a given service and a given category, such as a data services category, or an entire tenant (AWS account). A Pr parameter measures the percentage of resources the identity has (any) access to, in relation to all resources in the scope.

The calculation of power score for a given identity is built from the bottom up, leveraging the Pe parameter per service, in the following manner. Identities with a Pe score in the scope of the tenant which is greater than 99 are super admins with a power score of 100. Identities with a Pe score for an IAM service in the scope of the tenant greater than 99 are IAM admins with a power score of 100. For the rest of the identities, embodiments define the admin categories, for which an identity is given a category power score as detailed below. Each admin category is composed of a list of one or more relevant services. For example, data admin is composed of S3, RDS, DynamoDB, etc. Each cloud service belongs to a single admin category only, where, for each admin category, for each cloud service in that category, systems calculate a Pe score (service score) for the identity for the cloud service. For example, looking at an example identity, in the admin category of data admin, the following vector is produced [S3:80, RDS:20, DynamoDB:0, . . . ]. Various embodiments calculate a combined power score for the admin category (category power score), derived from all the Pe scores of the cloud services, in the formula detailed below. In that stage, a power score for the identity in each of the admin categories is derived. For example, an example user has the following scores for the following admin categories of Data Admin: 70, Compute Admin: 40, IAM Admin: 10, . . . , etc. Systems proceed to calculate the global power score for the identity, based on the category power score for each admin category, following the formula detailed herein.

Combined Power Scores

Given a category, such as Data Admin, with various Pe values for its cloud services. For example, Data Admin services: [RDS:80, DynamoDB:20 Redshift:70]. Systems need to calculate the final score for the admin category of Data Admin. For that, various methods use a weighted system where each cloud service gets a weight between 0.5 to 1.5 by its importance, with a default weight of 1. The calculation for the admin category power score is as follows. For each Pe value for services in that admin category, Pe=W*Pe, where W is the weight for that services.

MAX_SCORE_COEFF is the coefficient given to the max score in that category.

Currently, MAX_SCORE_COEFF=0.8.

Admin category score=MAX_SCORE_COEFF*MAX(Pe Score)+(1−MAX_SCORE_COEFF)*Average(Pe Score).

Essentially, the highest Pe value of a user in a given category should elevate its score. For example, RDS full access is enough to get a score of 80 in the Data Admin category. The rest of the 20 points are determined by the average Pe value for the other services in that category.

In the above example, Pe Values=[RDS:80, DynamoDB:20 Redshift:70].

Weights=[RDS:1, DynamoDB:1 Redshift:1], the Pe values are taken as they are.

Max Pe=80 (for RDS)

Average Pe=56.6

MAX_SCORE_COEFF=0.8

Data Admin Category Power Score=0.8*80+0.2*56.6=75.32

Given the list of admin categories scores, it is desired to compose a single identity power score out of those. That score is called a global power score. To compile this score, systems follow the following logic. If a user has a high score in a single admin category, various embodiments intend to give this user a high global power score as well, since this user is powerful. Nonetheless, it is important to cap the power score of the user, given the user is an admin only in a single category. In various embodiments, an important exception is IAM, where an IAM admin is elevated to the highest global power score. In addition, if the results of the global power score is lower than the identity's global Pe value (the ratio of all identity's entitlements in the tenant, out of all possible entitlements in that tenant), systems take the maximum of the 2.

Given a list of admin category scores, the global power score is calculated with the following formula.

A threshold (THRESHOLD) is defined for any admin category score to be considered an admin in that category as: ADMIN_CATEGORY_ADMIN_THRESHOLD (current value is 80). The base global power score is defined for an identity that is admin in any category as: BASE_ADMIN_SCORE (current value is 80).

- IF IAM Admin Category score = 100:
  - global_power_score = 100
- ELSE
  - MAX_ADMIN_CATEGORY_SCORE = the highest score a user has in any admin category
  - IF MAX_ADMIN_CATEGORY_SCORE > ADMIN_CATEGORY_ADMIN_THRESHOLD, it means the identity has an admin category in which it is considered admin:
    - global_power_score = BASE_ADMIN_SCORE + (1 − (BASE_ADMIN_SCORE/100)) * AVERAGE(admin category scores)
  - ELSE
    - global_power_score = (BASE_ADMIN_SCORE/100) * MAX(admin category scores) + (1 − BASE_ADMIN_SCORE) * AVERAGE(admin category scores)
- IF global_power_score < global_Pe_value
  - global_power_score = global_Pe_value A query generates the base data set, for the identity power score calculation. This query returns for each tenant identity service the Pe and Pr score, along with extra stats and enrichment data.

Various embodiments go further to define priorities and weights for services that are more important. Additionally, embodiments define a set of critical actions for each service and weight the Pe accordingly.

It will be appreciated that the examples contemplated herein shall be construed as non-limiting, and various embodiments of the present disclosure are adapted to perform the methods described herein for any additional scenarios, systems, or services in order to calculate a power score. Various embodiments are also adapted to provide power scores for users, groups of users, machines, and others of the like in order to provide custom rules and policies in cloud environments.

Abnormal Access Detection

The present disclosure provides systems and methods for abnormal Classless Inter-Domain Routing (CIDR) access detection. Various embodiments include a scoring system that assigns each CIDR (e.g., a range of IP addresses) that has access to a customer's environment a score (e.g., a score of 0-100), signifying how abnormal the risky CIDR is in the context of the whole environment access configuration. This scoring system helps identify abnormal and risky CIDRs that might indicate an attacker is able to access the customer's environment. In addition, in various embodiments, a baseline is created for one or more selected attributes/parameters that present the normal CIDR blocks in order to identify malicious/abnormal ones.

The posture control systems described herein are adapted to generate public exposure alerts, although, these alerts do not indicate how risky the exposure is. This approach can make it difficult for security administrators to prioritize remediation of public exposure issues. The posture control systems have the ability to review a whole environment's configurations, therefore, enabling the detection of each and every CIDR block that gets access to the customer's environment. Because of this visibility, the systems can detect abnormal and risky IPs that have access to the customers environment.

In an embodiment, the present systems and methods can be utilized to detect new abnormal access. For example, if some suspicious actor gains access to the customers environment, and tries to leave a backdoor by allowing network access to some of the customers EC2 instances, the present systems will detect the new abnormal access using various methods described herein. The goals of the present scoring processes include detection and prevention. More particularly, to detect suspicious IP addresses and CIDR blocks that have access to the customer's environment, and prioritize public exposure alerts severity accordingly, and to suggest a correct Security Group (SG) configuration taking into account the risky CIDR blocks. Various embodiments utilize a variety of data (i.e., categories and parameters) in order to calculate the CIDR and SG scores. The data can include assets, public exposure, power score, vulnerabilities, IP reputation, enrichment data, and the like. Further, The process can be divided into two logical parts, CIDR scoring and SG recommendation.

When a cloud compute instance is exposed to the internet, it allows inbound traffic such as SSH, HTTP, RDP, etc. The present disclosure provides systems and methods for identifying which IP addresses can access each instance and through which ports. In various embodiments, this detection is based on the configuration of the cloud environment fetched by cloud APIs. By identifying such public exposure, customers can see which of their compute resources are exposed to the internet and what is the level of exposure. Further, this can be used as a building block for complex security policies.

Various network traffic controls are utilized by cloud providers. These controls include Network Interface Card (NIC) level, subnet level, and routing level controls. In various cases, if an instance allows certain traffic to pass through all network traffic controls, that instance is determined to be exposed to the internet.

For Amazon Web Services (AWS), the public IP address can be the first condition to check. If an instance is not assigned with a public IP address, a session cannot be initiated from the internet to that instance. A security group is a network traffic control that works at the NIC level. Security groups have special attributes including stateful security group rules, the ability to specify allow rules, the ability to evaluate rules before allowing traffic, etc. If a specific IP address or range of addresses are not explicitly mentioned in a security group rule, then this specific IP address or range of addresses are not allowed to access the instance. Parsing an instance with more than one security group can be done by concatenating all the rules to one large security group. Further, an Access Control List (ACL) is a network traffic control that works on the subnet level and includes rules which are stateless, has the ability to allow and deny rules which by default block all traffic, and allows rules to be enforced in an order when deciding whether to allow traffic or not.

In an exemplary use case, in an AWS environment, the instance is checked if it has a public IP address first. If it does, the instance security group rules are extracted which define the addresses that are able to access the instance. Then, the ACL rules can be extracted to create an ACL allow list and to check which of the addresses that are mentioned in the security groups are able to pass through the ACL rules based on the created allow list. This intersection of addresses will be the final set of addresses that are able to access the instance. The last check includes checking if there is a route to the internet gateway. If there is, the systems add the set of addresses to the list of addresses that are able to access the instance. In cases where an instance has more than one security group assigned to it, the systems make a new logical security group that contains all the other security groups rules. When an instance is assigned to a non-default route table, in order to match the correct routing table to the instance, the systems first check if there is a direct route table associated to the subnet in which the instance resides, if there is no such direct association the systems extract the main routing table of the subnet.

For Azure, the following network components play a role in allowing or denying inbound access from the internet to a compute instance. The public IP address is the first condition the systems are adapted to check. If an instance is not assigned with a public IP address, it is not able to receive traffic from the internet. The NIC is a separated object that can be assigned to the Virtual Machine (VM) instance. More than one NIC can be assigned to an instance while each NIC is an independent interface that can be a part of a different subnet. Each NIC can contain more than one IP configuration, each IP configuration can be assigned with different public and private IP addresses while the private addresses must be a part of the same subnet in which the NIC resides. Network Security Group (NSG) is a network traffic control that can run allow and deny rules in order to allow or block traffic. Because of the nested nature of the network elements, the systems must check for each VM instance, all its NICs and for each NIC, all its IP configurations.

In an example use case, for each IP configuration, if it has a public IP address assigned to it, the systems are adapted to extract NIC and subnet NSG rules if they exist and calculate which traffic can pass through the extracted NSG rules. The systems can then check that this traffic is not routed to a non-internet destination using a user-defined route.

For Google Cloud Platform (GCP), the components are similar to real-world on premises network components. Virtual Private Cloud (VPC) is the most high-level network component on GCP, practically the VPC is the network in which systems can add network elements. The VPC can be spread over multiple regions, is not assigned with IP address ranges, and by default, does not allow inter-VPC communication. Again, a subnet is a part of a network that has an IP range and resides within a region, sometimes referred to as "subnetwork" on GCP. Each VPC is assigned with a default firewall. Inbound and outbound traffic restrictions can be set for the firewall. In order to have any type of communication to a VM, there must be an allow rule in the FW that accepts the traffic. Default firewall configurations include allow all outbound traffic, deny all inbound traffic, and allow all VMs in the same VPC to communicate with each other on any protocol. An NIC makes it possible for the VM to communicate with other devices. More than a single NIC can be attached to the same VM. A VM that has multiple NICs is able to communicate with each endpoint on each VPC that the NICs reside in, without any extra network configuration. For a single NIC VM, the systems would have to configure a VPC network peering in order to allow inter-VPC communication. The following criteria must be satisfied for an instance to have direct incoming internet access. The network must have a valid default internet gateway route or custom route whose destination IP range is the most general (0.0.0.0/0). This route defines the path to the internet. Firewall rules must allow ingress traffic to the instance. The instance must have an external IP address. An external IP address can be assigned to an instance when it is created or after it has been created.

In an example, for each VM instance, the systems check if it has a public IP address. The systems then check if it has a route to the internet. Then, the firewall rules are gathered, and the systems can calculate which traffic can pass through the firewall.

Figure 28:
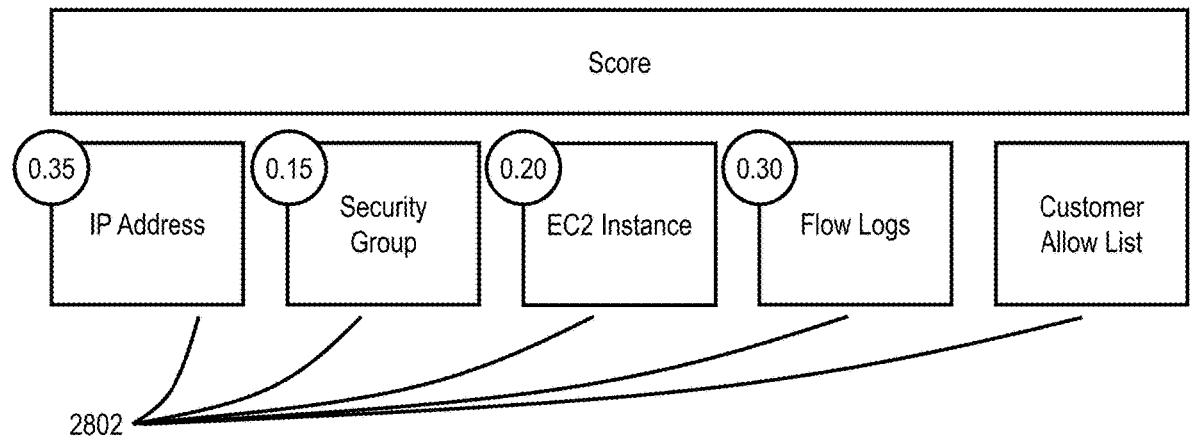
FIG. 28 is a diagram representing various scoring categories and parameters.

Again, the present disclosure provides mechanisms for scoring of CIDR blocks and Security Groups (SGs). The score assigned to each of the CIDR blocks and the SGs can be based on a 0-100 scale depending on the risk of exposure. In various embodiments, the present systems and methods can be utilized to detect new abnormal access. For example, if some suspicious actor gains access to the customers environment and tries to leave a backdoor by allowing network access to some of the customers EC2 instances, the present systems will detect the new abnormal access using various methods described herein. The goals of the present scoring processes include detection and prevention. More particularly, to detect suspicious IP addresses and CIDR blocks that have access to the customer's environment, and prioritize public exposure alerts severity accordingly, and to suggest a correct SG configuration taking into account the risky CIDR blocks. Various embodiments utilize a variety of data in order to calculate the CIDR and SG scores. The data can include assets, public exposure, power score, vulnerabilities, IP reputation, enrichment data, and the like. Further, The process can be divided into two logical parts, CIDR scoring and SG recommendation. FIG. 28 is a diagram representing various scoring categories 2802. These categories and parameters are also shown below. In various embodiments, each of the categories 2802 can be assigned a category score and a weight, the weight determining that categories weight when calculating the total risk score of the CIDR. Also, each category 2802 includes various parameters that determine that categories score.

IP address
   Geo location
   TOR
   VPN

Threatlabz categories
    Amount of SGs containing the IP
    IP range size
Security group
    Amount of affected instances
    Amount of rules in the SG
EC2 instance
    Public exposure
    Power score
    MAX vulnerability score
Flow logs
    Traffic amount
    Session length
    Session times
Customers' allow lists
    Exclude the allow lists from the pipeline In various embodiments, the present systems and methods can include the following steps. For IP and CIDR scoring, for each public CIDR block that appears in a SG that is assigned to at least one EC2 instance, the following checks and scoring steps are performed. The following describes how the scoring is performed by category, i.e., how each category is assigned its category score.

IP address (for each IP address in the CIDR).
    The more rare the geo location of the IP, the higher score it will get in this category.
    If the IP is being detected as a VPN address, it will be assigned a higher score in this category.
    If the IP is being detected as malicious or as part of a TOR network, it will be assigned the highest score in this category.
    The more the IP appears in SGs, it will be considered more legitimate, and will be assigned a lower score in this category.
    The smaller the CIDR block is, the higher the score it will be assigned in this category.
    The score in this category will be the score of the highest scored IP contained in the CIDR block.
Security group
    The more EC2 instances are affected by the SG, the lower score it will be assigned in this category.
    The more rules the SG has, the lower the score will be in this category.
EC2 instance
    If the affected instance is publicly exposed, it will be assigned a higher score in this category.
    The higher power score the affected instance has, the higher score will be assigned in this category.
    The higher vulnerability score the affected instance has, the higher score will be assigned in this category.

Figure 29:
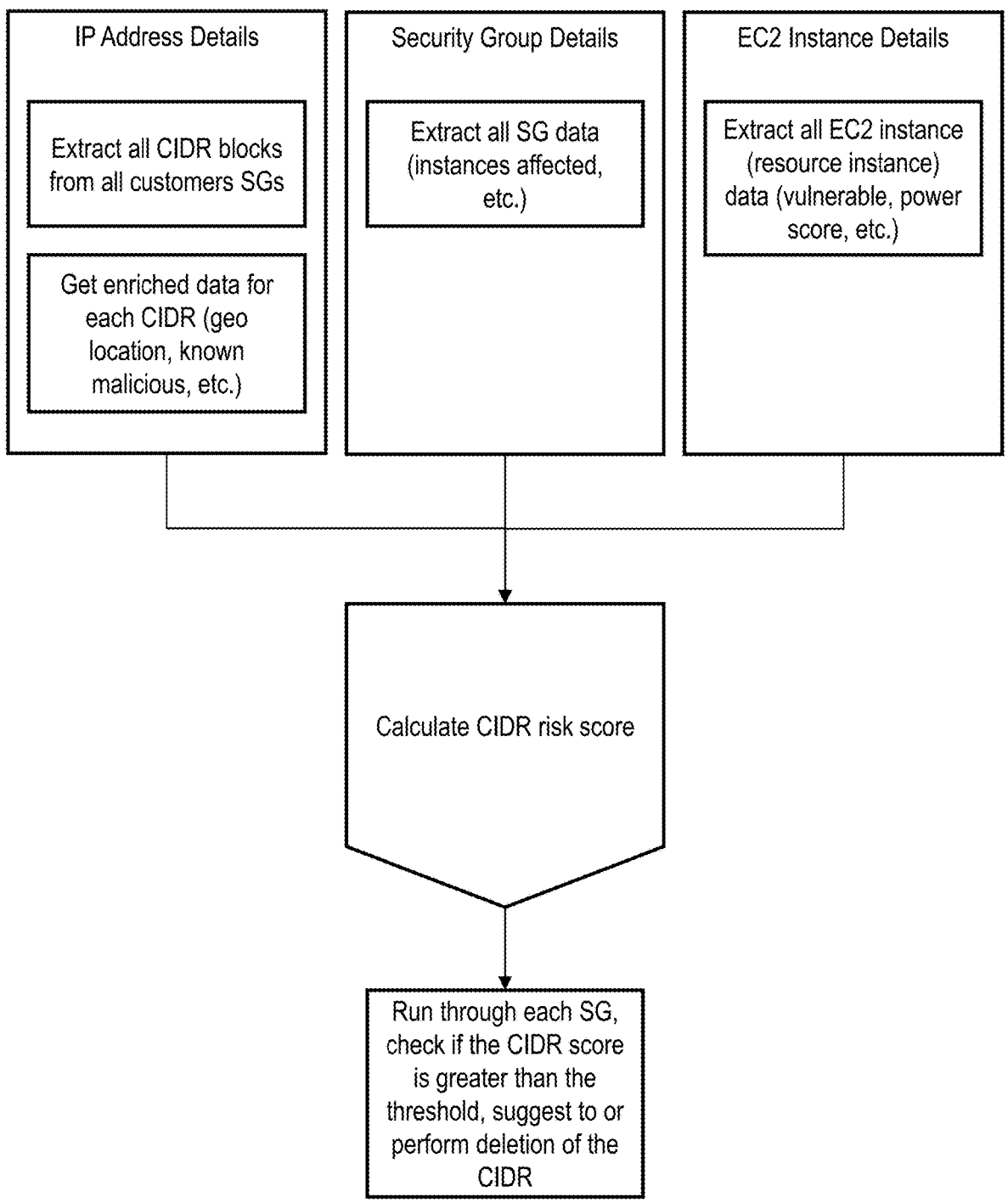
FIG. 29 is a flow diagram of an example implementation of the CIDR scoring and suggestion process of the present disclosure.

For scoring and recommendations, the systems are adapted to run through each public CIDR in the SG. If the CIDR has a score of more than a predefined threshold (e.g., greater than 0.8) the systems can suggest to remove the CIDR from the SG rules. The systems will score the SG with the score of the highest scored CIDR block contained is the SG. This scoring and suggestion process is depicted in FIG. 29.

Figure 30:
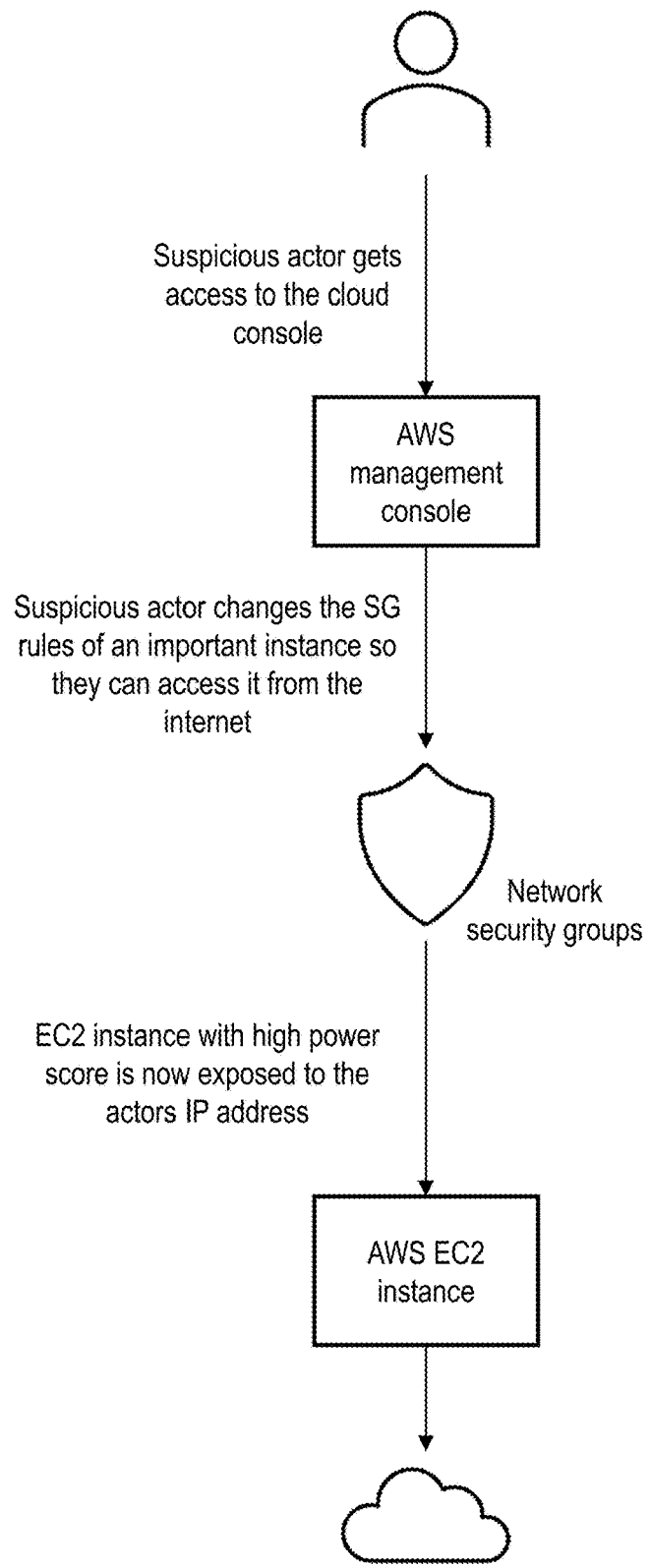
FIG. 30 is a flow diagram of a possible attack vector.

For example, utilizing the present systems and methods on a possible attack vector is described below. FIG. 30 is a flow diagram of a possible attack vector. This example assumes a suspicious actor gains access to the cloud console of a given customer, as they try to maintain access to the account, they can look for a vulnerable EC2 instance or any other resource instance that resides in a public subnet. Assuming they find this kind of instance and can edit it's security group rule and add a rule that allows them to access the instance from their IP address in Japan, the following output is provided by the systems. Below are the various score categories and the details associated therewith based on the present example.

IP address
    CIDR Block: 12.13.14.15/32
    Geo location: Japan (which represent less than 1% of the CIDR geo locations in the environment)
    TOR: False
    VPN: False
    Malicious: True
    CIDR size: 1
Security group
    Affected instances: 2
    Amount of rule in the SG: 2
EC2 instance
    Public exposure: True
    Power score: 95
    Max vulnerability score: 9.3

Assuming the above details, the expected risk score will be 94. Taking a look at the same scenario but with different technical details, the score will change. This example includes the following details.

IP address
    CIDR Block: 1.2.3.0/16
    Geo location: USA (which represent less than 75% of the CIDR geo locations in the environment)
    TOR: False
    VPN: False
    Malicious: False
    CIDR size: 65536
Security group
    Affected instances: 30
    Amount of rule in the SG: 8
EC2 instance
    Public exposure: False
    Power score: 40.
    Max vulnerability score: 7

Assuming the above details, the expected risk score will be 45. Based on the above two examples, each SG that contains the 12.13.14.15/32 CIDR will trigger an alert suggesting an action such as the removal of the rules that allow access to this risky CIDR block or IP address, thereby blocking access for the CIDR block or singular IP address. In various embodiments, the systems and methods are adapted to perform the suggested action automatically. It will be appreciated that the present systems and methods can be utilized to assign a risk score to single IP addresses and CIDR groups based on their characteristics, i.e., their score based on the various categories and parameters.

Process for Abnormal Access Detection

Figure 31:
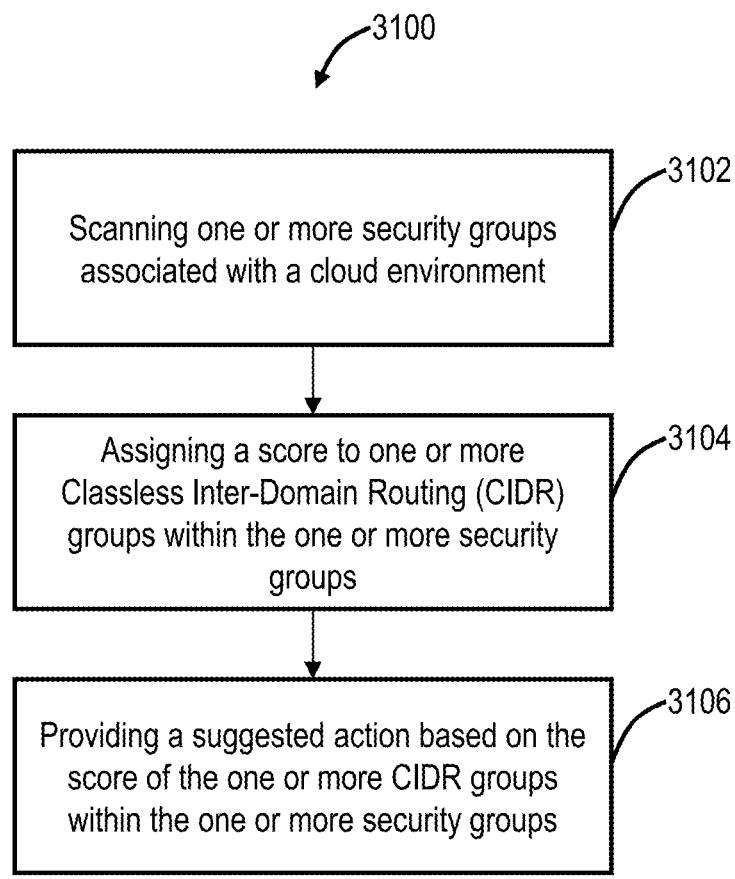
FIG. 31 is a flow chart of a process for abnormal access detection.

FIG. 31 is a flow chart of a process for abnormal access detection. The process 3100 includes scanning one or more security groups associated with a cloud environment (step 3102); assigning a score to one or more Classless Inter-Domain Routing (CIDR) groups within the one or more security groups (step 3104); and providing one or more suggested actions based on the score of the one or more CIDR groups (step 3106);

The process 3100 can further include wherein the one or more suggested actions include removing a CIDR of the one or more CIDR groups. Suggesting the removal of a CIDR can be based on a score of the CIDR being above a predefined threshold. The steps can further include calculating a score for each of the one or more CIDR groups within the one or more security groups; and assigning the calculated score to each of the one or more CIDR groups.

Each of the CIDR groups can include one or more Internet Protocol (IP) addresses, wherein the score is based on a risk associated with each of the IP addresses. IP addresses in a customer allow list can be excluded when calculating the score. The score can be based on a plurality of categories, wherein each of the categories is assigned a weight and a category score. Each of the categories can include a plurality of parameters, the parameters determining the category score assigned to each of the categories. The steps can further include performing the one or more suggested actions automatically. The assigned score can be a score between 0 and 100, wherein the score indicates how risky a CIDR group is.

Detailed Remediation Recommendations Utilizing Large Language Models (LLMs)

As part of the various posture control embodiments described herein, the present disclosure further provides systems and methods utilizing a custom LLM for producing detailed remediation recommendations for posture control alerts. In various embodiments, alerts against potential security issues for various entities and resources explain the risk to customers and provide remediation recommendations for each security risk. In many cases, security teams are unaware how to exactly fix the problems described by alerts in their cloud environments. The present invention is designed to outline the steps and guide the teams entrusted with fixing the alerts step by step until they are resolved. Since there are hundreds of alert possibilities in cloud environments, instead of manually going through each possible alert and looking for solutions for all the cloud providers, the present systems include a trained language model that is fed data about each cloud provider to detail all the steps that need to be followed to correct each alert.

It is important to provide detailed step-by-step remediations for all posture control alerts. The posture control systems described herein can identify a large number of issues and generate hundreds of alerts that need to be resolved. Instead of going through all of them manually to determine what the solution to each alert is, the present systems and methods train and utilize a LLM to described all the steps needed in order to resolve each alert.

Figure 32:
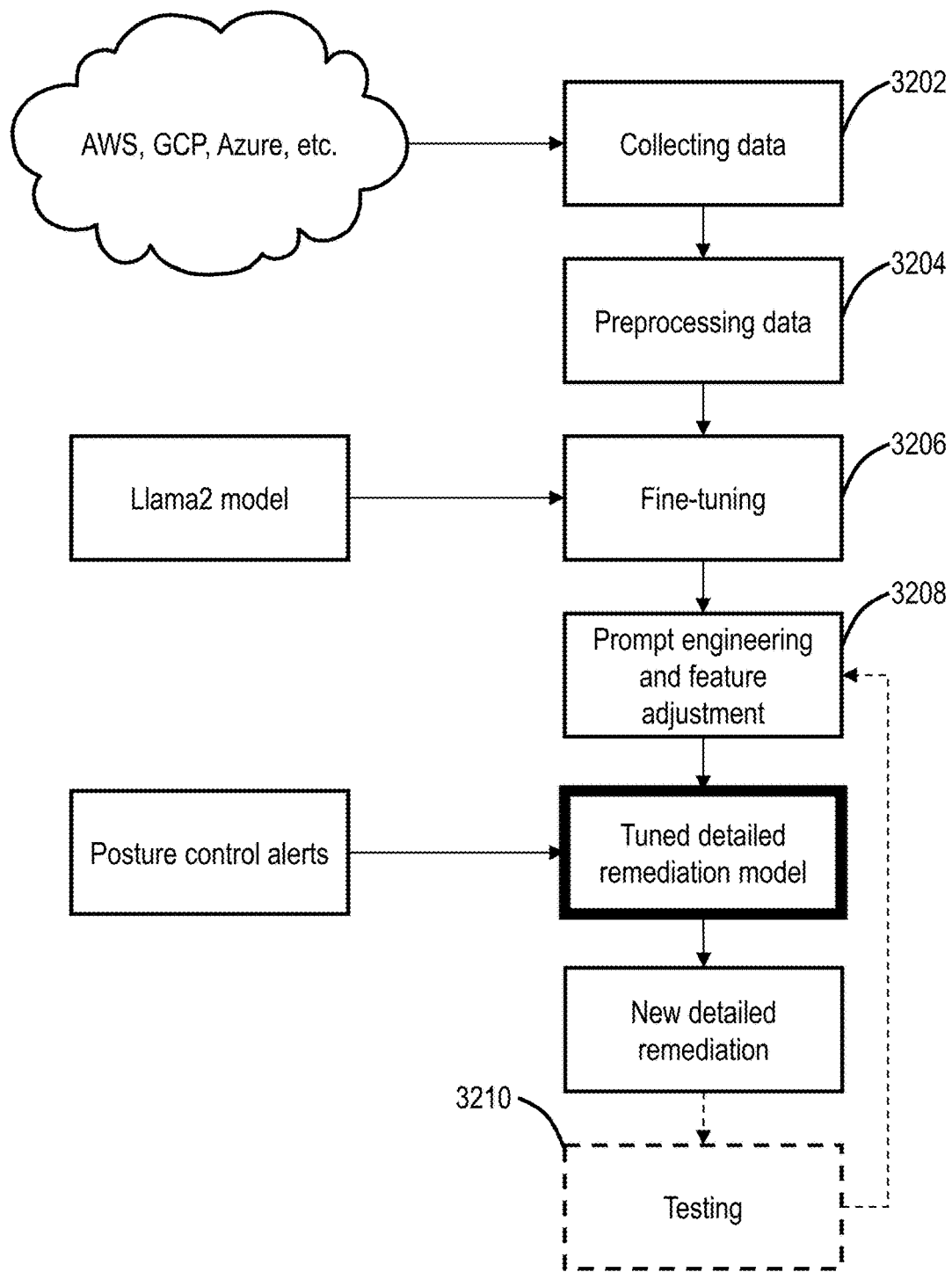
FIG. 32 is a flow diagram of an embodiment of the present systems and methods for detailed remediation recommendations utilizing LLMs.

FIG. 32 is a flow diagram of an embodiment of the present systems and methods for detailed remediation recommendations utilizing LLMs. In various embodiments, the LLM training process generates the new detailed remediations with various steps. These steps include data collection 3202, data preprocessing 3204, fine-tuning 3206, feature adjustments and prompt engineering 3208, and testing 3210. Data collection includes several functions that collect data from the internet, on AWS, Azure, GCP, etc. Over 3 million data points are collected from cloud provider documentation, Frequently Asked Questions (FAQs), press releases, and other sources of the like. A periodic update of the collected data can be performed using the functions, i.e., the model can be updated with newly collected data for accuracy.

For data preprocessing, to train the LLM, the data must be structured in a way that allows it to be used as input. Documentation is categorized in a way where the title of the document is formulated as a question, and the explanation provided in the documentation is the answer. The data that describes, in steps, how to perform a given action is categorized in a way similar to the answer that a model should provide at the end, i.e., as an output.

Fine-tuning the model is used by GCP Vertex AI application, in various examples, the fine-tuning is supervised tuning with 25,000 training steps and a learning rate multiplier of 1e-5. It will be appreciated that other training steps and rate multipliers are contemplated as required by the model.

Feature adjustment values that were determined to worked best for this application of an LLM include 0.1 for temperature, a token limit of 512, 3 most probable tokens, and a Top-P of 0.5. Again, it will be appreciated that other values are contemplated as required by the model.

Testing is performed to make sure that the model is accurate, and that the results are consistent. After different variables are tested and adjustments to the prompts are made, a desired outcome can be achieved. After testing remediations and checking the results, the model was witnessed as being accurate, with a success rate of over 95%.

Before implementation of the present systems and methods, a remediation recommendation could include wording such as "Enforce MFA for power identities with cloud console access." Such a recommendation does not specifically describe how to exactly perform the remediation, but simply states a broad description of what must be done. After implementation of the present detailed remediation recommendation systems, the alerts can be accompanied by a remediation recommendation as follows.

1. Sign into the AWS Management Console and open the IAM console at https://console.aws.amazon.com/iam/.
2. In the navigation pane, choose Users.
3. In the Users list, choose the name of the IAM user.
4. Choose the Security Credentials tab. Under Multi-factor authentication (MFA), choose Assign MFA device.
5. In the wizard, type a Device name, choose Authenticator app, and then choose Next. IAM generates and displays configuration information for the virtual MFA device, including a QR code graphic. The graphic is a representation of the "secret configuration key" that is available for manual entry on devices that do not support QR codes.
6. Open your virtual MFA app. For a list of apps that you can use for hosting virtual MFA devices, see Multi-Factor Authentication. If the virtual MFA app supports multiple virtual MFA devices or accounts, choose the option to create a new virtual MFA device or account.
7. Determine whether the MFA app supports QR codes, and then do one of the following:
    a. From the wizard, choose Show QR code, and then use the app to scan the QR code. For example, you might choose the camera icon or choose an option similar to Scan code, and then use the device's camera to scan the code.
    b. From the wizard, choose Show secret key, and then type the secret key into your MFA app.
8. When you are finished, the virtual MFA device starts generating one-time passwords.
9. On the Set up device page, in the MFA code 1 box, type the one-time password that currently appears in the virtual MFA device. Wait up to 30 seconds for the device to generate a new one-time password. Then type the second one-time password into the MFA code 2 box. Choose Add MFA.

Such a remediation recommendation is much more descriptive and walks a user through the process for remediating any issue that the posture control system has uncovered. As stated, such a remediation recommendation can be provided with any alert from the posture control system allowing security personnel to quickly fix any issues that may be introducing risk to the cloud environment.

The various embodiments for detailed remediation recommendations utilizing LLMs described herein provide step-by-step guidance for remediating posture control alerts. It will be appreciated that the present systems can be further utilized for providing remediation recommendations for any other computing and networking issues identified by any security system of the like for providing step-by-step guidance. Further, the cloud-based system can be adapted to ingest the detailed remediations, generic remediations, etc. and perform the steps automatically based on a tenants configurations. The LLM described herein is fine tuned with cloud provider data, tenant-specific data, clous security system data, etc. to be as accurate as possible on a per-tenant basis when providing recommended remediations. Further, the LLM can be "retrained" using updated data on a pre-configured time interval or on demand based on cloud environment updates, expansion, etc.

Training an LLM for Detailed Remediation Recommendations

In an exemplary use case, as part of the LLM training process, over 3 million pieces of data were collected about Amazon Web Services (AWS), Azure, and Google Cloud Platform (GCP). These data points are part of the cloud providers' documentation, as well as questions and answers, press releases of each company, and others. As part of the fine-tuning of the model, posture control documentation and internal intelligence were also used as part of the process of fine-tuning.

Again, in order to train the LLM, the data must be structured in a way that allows it to be used as input. Documentation is categorized in a way where the title of the document is formulated as a question, and the explanation provided in the documentation is the answer. The data that is described in steps explaining how to perform a given action is categorized in a way similar to the answer that the model should provide at the end. For example, from AWS documentation on enabling Multi-Factor Authentication (MFA), the data for training the model is structured as:

Question: How To enable a virtual MFA device for an IAM user
Answer:
1. Sign into the AWS Management Console and open the IAM console at https://console.aws.amazon.com/iam/.
2. In the navigation pane, choose Users.
3. In the Users list, choose the name of the IAM user.
4. Choose the Security Credentials tab. Under Multi-factor authentication (MFA), choose Assign MFA device.
5. In the wizard, type a Device name, choose Authenticator app, and then choose Next. IAM generates and displays configuration information for the virtual MFA device, including a QR code graphic. The graphic is a representation of the "secret configuration key" that is available for manual entry on devices that do not support QR codes.
6. Open your virtual MFA app. For a list of apps that you can use for hosting virtual MFA devices, see Multi-Factor Authentication. If the virtual MFA app supports multiple virtual MFA devices or accounts, choose the option to create a new virtual MFA device or account.
7. Determine whether the MFA app supports QR codes, and then do one of the following:
    a. From the wizard, choose Show QR code, and then use the app to scan the QR code. For example, you might choose the camera icon or choose an option similar to Scan code, and then use the device's camera to scan the code.
    b. From the wizard, choose Show secret key, and then type the secret key into your MFA app.
8. When you are finished, the virtual MFA device starts generating one-time passwords.
9. On the Set up device page, in the MFA code 1 box, type the one-time password that currently appears in the virtual MFA device. Wait up to 30 seconds for the device to generate a new one-time password. Then type the second one-time password into the MFA code 2 box. Choose Add MFA.

After testing several different models, it was found that Llama2 with 13B parameters is the model that most effectively suits the present models' task. The performance, versatility, and suitability of Llama2 make it an ideal choice. Llama2 demonstrates competent capabilities for understanding and generating natural language text, making it useful for fine-tuning and customizing the present LLM. Llama2 has also been trained on a vast corpus of diverse cybersecurity data, enabling it to grasp the intricacies and nuances of the domain with ease. Alternatively, in various embodiments, other models are utilized, and Llama2 shall be contemplated as a non-limiting example.

Temperature can be controlled to tune the degree of randomness in token selection. Lower temperatures are good for prompts that expect a true or correct response, while higher temperatures can lead to more diverse or unexpected results. With a temperature of 0 the highest probability token is always selected. Token limit determines the maximum amount of text output from one prompt. A token is approximately four characters. Top-k changes how the model selects tokens for output. A top-k of 1 means the selected token is the most probable among all tokens in the model's vocabulary (also called greedy decoding), while a top-k of 3 means that the next token is selected from among the 3 most probable tokens (using temperature). Top-p changes how the model selects tokens for output. Tokens are selected from most probable to least until the sum of their probabilities equals the top-p value. For example, if tokens A, B, and C have a probability of 0.3, 2, and 0.1 and the top-p value is 0.5, then the model will select either A or B as the next token (using temperature).

Again, while testing the present systems and methods, examples include 0.1 for temperature due to the need for consistency, a token limit of 512 to ensure concise answers, 3 most probable tokens, a Top-k value of 40, and a Top-P of 0.5 due to consistent answers not requiring creativity. Again, it will be appreciated that other values are contemplated as required by the model in different situations.

The last step of building this model is to program a prompt that provides step-by-step remediation so that it can be used correctly. The first step in creating an effective prompt is to give the model a context in which it should be programmed. Such a prompt includes instructing the model that it is a cloud security expert with extensive knowledge of DevOps operations at various different cloud providers: AWS, Azure, and GCP. The model is instructed that it will receive an alert from Cloud-Native Application Protection Platform (CNAPP) and will tell the customer precisely how to resolve the problem step-by-step in a detailed and clear manner through the cloud provider's console. In addition, it is instructed that it will provide the client with a Command Line Interface (CLI) command through which one can solve the security issue only if there is such a command available, and if such a command does not exist, it will not list it in the response.

The model is adapted to receive an input such as the following.

{policy title, policy description, dynamic description, cloud provider, generic remediation}

In the policy title, it will have a general description of the alert, but in the policy description, it will include more details about the alert and why it may pose a security risk. In a dynamic description, the alert will be described as the client will see it with the details of the user or resource in the format $[identity/resource]. The model does not use the names found in the dynamic description in the answers, but rather uses User or Resource. During the process of getting the answer, the cloud provider will let the model know which cloud provider it should refer to in the answer, and finally, it will receive the generic remediation that needs to be elaborated. The "generic" remediation can be the remediations described in this disclosure, i.e., any remediation generated by the Cloud-Native Application Protection Platform (CNAPP) system. During this elaborated process, the model will specify in detail each step that needs to be taken on the cloud provider console to resolve the alert. Further, the model is instructed to utilize a step-by-step structure for providing remediations as shown above in the various examples.

Process for Utilizing LLMs for Detailed Remediation Recommendations

Figure 33:
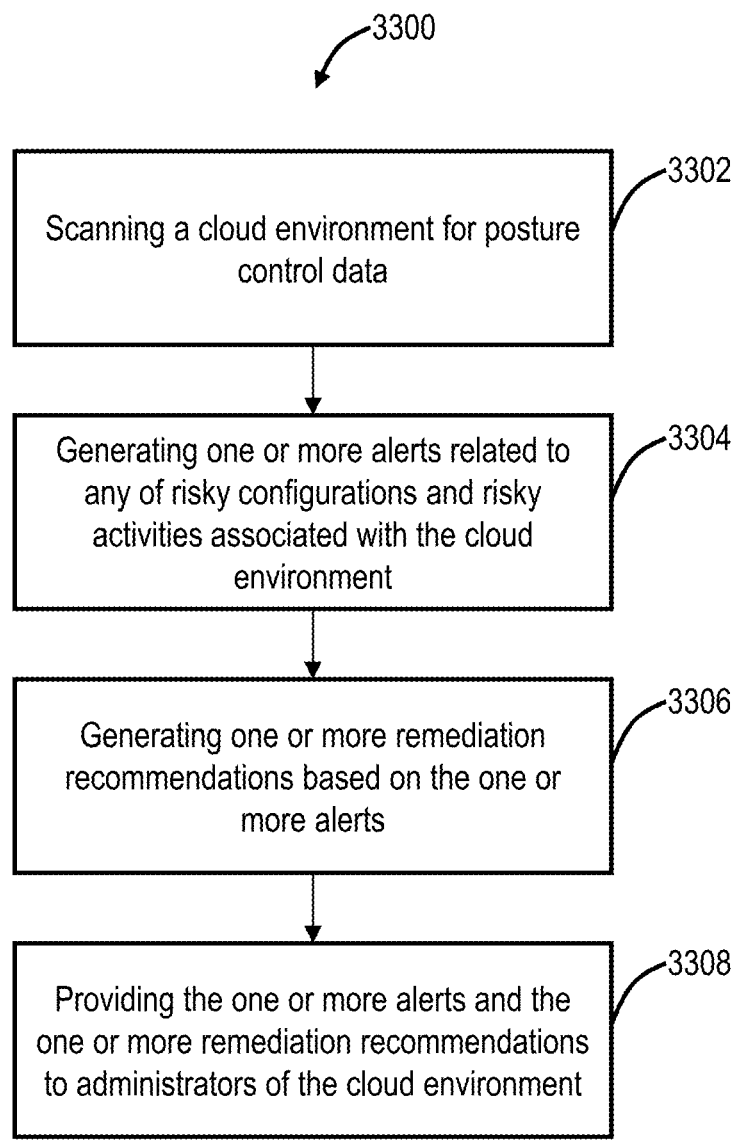
FIG. 33 is a flow chart of a process for utilizing an LLM for generating detailed remediation recommendations for cloud alerts.

FIG. 33 is a flow chart of a process 3300 for utilizing an LLM for generating detailed remediation recommendations for cloud alerts. The process 3300 includes scanning a cloud environment for posture control data (step 3302); generating one or more alerts related to any of risky configurations and risky activities associated with the cloud environment (step 3304); generating one or more remediation recommendations based on the one or more alerts (step 3306); and providing the one or more alerts and the one or more remediation recommendations to administrators of the cloud environment (step 3308).

The process 3300 can further include wherein the one or more remediation recommendations each includes a step-by-step list of actions required to resolve the risky configurations and risky activities. The generating one or more remediation recommendations can be performed by a trained Large Language Model (LLM). The steps can further include collecting data, wherein the data includes cloud provider documentation and cloud security system documentation; and training the LLM with the collected data. A different LLM can be trained for each tenant of a cloud-based system. The steps can further include periodically collecting updated data; and retraining the LLM with the updated data. The one or more remediation recommendations can be provided via a Command Line Interface (CLI) command. The one or more remediation recommendations can be generated based on one or more generic remediations generated by a Cloud-Native Application Protection Platform (CNAPP) system. The steps can further include performing actions associated with the one or more remediation recommendations automatically. The posture control data can include any of assets, identities, network flow logs, activities, and code repositories in the cloud environment, wherein the one or more alerts correspond to risks associated therewith.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A method comprising steps of:
   scanning a cloud environment for posture control data;
   generating one or more alerts related to any of risky configurations and risky activities associated with the cloud environment, wherein the generating the one or more alerts includes identifying correlated combinations of misconfigurations and risky activities that individually appear low-risk but collectively represent a high-impact security risk;
   generating one or more remediation recommendations based on the one or more alerts, wherein the generating the remediation recommendations includes prioritizing the recommendations by applying a machine-learning model trained to weigh the correlated combinations of misconfigurations and risky activities; and providing the one or more alerts and the one or more remediation recommendations to administrators of the cloud environment via a graphical user interface (GUI), wherein the GUI displays remediation instructions specifically based on contextual insights derived from the correlated combinations of misconfigurations and risky activities and wherein the one or more remediation recommendations are generated using the machine-learning model which is a tenant-specific Large Language Model (LLM) trained and periodically retrained with data comprising cloud provider documentation, cloud security system documentation, and tenant-specific context derived from the posture control data and the one or more alerts.

2. The method of claim 1, wherein the one or more remediation recommendations each includes a step-by-step list of actions required to resolve the risky configurations and risky activities.

3. The method of claim 1, wherein the steps comprise for training the machine-learning model:
collecting data, wherein the data includes cloud provider documentation and cloud security system documentation; and
training the LLM with the collected data.

4. The method of claim 3, wherein a different LLM is trained for each tenant of a cloud-based system.

5. The method of claim 3, wherein the steps further comprise:
periodically collecting updated data; and
retraining the LLM with the updated data.

6. The method of claim 1, wherein the one or more remediation recommendations are provided via a Command Line Interface (CLI) command.

7. The method of claim 1, wherein the one or more remediation recommendations are generated based on one or more generic remediations generated by a Cloud-Native Application Protection Platform (CNAPP) system.

8. The method of claim 1, wherein the steps further comprise:
performing actions associated with the one or more remediation recommendations automatically.

9. The method of claim 1, wherein the posture control data includes any of assets, identities, network flow logs, activities, and code repositories in the cloud environment, and wherein the one or more alerts correspond to risks associated therewith.

10. A non-transitory computer-readable medium comprising instructions that, when executed, cause one or more processors to perform steps of:
scanning a cloud environment for posture control data;
generating one or more alerts related to any of risky configurations and risky activities associated with the cloud environment, wherein the generating the one or more alerts includes identifying correlated combinations of misconfigurations and risky activities that individually appear low-risk but collectively represent a high-impact security risk;
generating one or more remediation recommendations based on the one or more alerts, wherein the generating the remediation recommendations includes prioritizing the recommendations by applying a machine-learning model trained to weigh the correlated combinations of misconfigurations and risky activities; and
providing the one or more alerts and the one or more remediation recommendations to administrators of the cloud environment via a graphical user interface (GUI), wherein the GUI displays remediation instructions specifically based on contextual insights derived from the correlated combinations of misconfigurations and risky activities and wherein the one or more remediation recommendations are generated using the machine-learning model which is a tenant-specific Large Language Model (LLM) trained and periodically retrained with data comprising cloud provider documentation, cloud security system documentation, and tenant-specific context derived from the posture control data and the one or more alerts.

11. The non-transitory computer-readable medium of claim 10, wherein the one or more remediation recommendations each includes a step-by-step list of actions required to resolve the risky configurations and risky activities.

12. The non-transitory computer-readable medium of claim 10, wherein the steps comprise for training the machine-learning model:
collecting data, wherein the data includes cloud provider documentation and cloud security system documentation; and
training the LLM with the collected data.

13. The non-transitory computer-readable medium of claim 12, wherein a different LLM is trained for each tenant of a cloud-based system.

14. The non-transitory computer-readable medium of claim 12, wherein the steps further comprise:
periodically collecting updated data; and
retraining the LLM with the updated data.

15. The non-transitory computer-readable medium of claim 10, wherein the one or more remediation recommendations are provided via a Command Line Interface (CLI) command.

16. The non-transitory computer-readable medium of claim 10, wherein the one or more remediation recommendations are generated based on one or more generic remediations generated by a Cloud-Native Application Protection Platform (CNAPP) system.

17. The non-transitory computer-readable medium of claim 10, wherein the steps further comprise:
performing actions associated with the one or more remediation recommendations automatically.

18. The non-transitory computer-readable medium of claim 10, wherein the posture control data includes any of assets, identities, network flow logs, activities, and code repositories in the cloud environment, and wherein the one or more alerts correspond to risks associated therewith.

* * * * *